US012573966B2

(12) United States Patent　　　(10) Patent No.:　US 12,573,966 B2

Mondal　　　(45) Date of Patent:　　Mar. 10, 2026

(54) SYSTEMS AND METHODS FOR CONTROLLING MULTI-LEVEL DIODE-CLAMPED INVERTERS USING SPACE VECTOR PULSE WIDTH MODULATION (SVPWM)

(71) Applicant: Inertech IP LLC, Plano, TX (US)

(72) Inventor: Subrata K Mondal, South Windsor, CT (US)

(73) Assignee: Inertech IP LLC, Plano, TX (US)

( * ) Notice: Subject to any disclaimer, the term of this patent is extended or adjusted under 35 U.S.C. 154(b) by 0 days.

(21) Appl. No.: 18/623,734

(22) Filed: Apr. 1, 2024

(65) Prior Publication Data

US 2024/0333173 A1　　Oct. 3, 2024

Related U.S. Application Data

(63) Continuation of application No. 17/130,779, filed on Dec. 22, 2020, now Pat. No. 11,949,343, which is a (Continued)

(51) Int. Cl.
　　*H02M 7/487*　　　(2007.01)
　　*H02J 9/06*　　　(2006.01)
　　(Continued)

(52) U.S. Cl.
　　CPC ............. *H02M 7/487* (2013.01); *H02J 9/061* (2013.01); *H02M 3/04* (2013.01); *H02M 1/0845* (2013.01);
　　(Continued)

(58) Field of Classification Search
　　CPC .. H02M 7/487; H02M 7/53873; H02M 7/538; H02M 7/75; H02M 7/53876
　　See application file for complete search history.

(56) References Cited

U.S. PATENT DOCUMENTS 5,200,644 A　　4/1993　Kobayashi et al.
5,343,079 A　　8/1994　Mohan et al.
　　　　　　　(Continued)

FOREIGN PATENT DOCUMENTS

EP　　　2722978 A2　　4/2014

OTHER PUBLICATIONS

"Data Center Efficiency Assessment" by National Resources Defense Council—NRDC; Aug. 2014.

(Continued)

*Primary Examiner* — Gary A Nash
(74) *Attorney, Agent, or Firm* — Weber Rosselli & Cannon LLP

(57)　　　　ABSTRACT

Control systems for a multi-level diode-clamped inverter and corresponding methods include a processor and a digital logic circuit forming a hybrid controller. The processor identifies sector and region locations based on a sampled reference voltage vector V* and angle $\theta_e^*$. The processor then selects predefined switching sequences and pre-calculated turn-on time values based on the identified sector and region locations. The digital logic circuit generates PWM switching signals for driving power transistors of a multi-level diode-clamped inverter based on the turn-on time values and the selected switching sequences. The control system takes care of the existing capacitor voltage balancing issues of multi-level diode-clamped inverters while supplying both active and reactive power to an IT load. Using the control system, one can generate a symmetrical PWM signal that fully covers the linear under-modulation region.

19 Claims, 15 Drawing Sheets

Related U.S. Application Data continuation of application No. 16/545,974, filed on Aug. 20, 2019, now Pat. No. 10,879,815, which is a continuation of application No. 15/913,387, filed on Mar. 6, 2018, now Pat. No. 10,389,272, which is a continuation of application No. 15/493,978, filed on Apr. 21, 2017, now Pat. No. 9,912,251, which is a continuation of application No. PCT/US2015/056785, filed on Oct. 21, 2015.

(60) Provisional application No. 62/066,672, filed on Oct. 21, 2014.

(51) Int. Cl.

| | |
|---|---|
| H02M 3/04 | (2006.01) |
| H02M 7/5387 | (2007.01) |
| *H02M 1/084* | (2006.01) |
| *H02M 7/483* | (2007.01) |
| *H02M 7/49* | (2007.01) |

(52) U.S. Cl.
CPC ............ *H02M 7/4835* (2021.05); *H02M 7/49* (2013.01); *H02M 7/53873* (2013.01); *H02M 7/53875* (2013.01); *H02M 7/53876* (2021.05)

(56) References Cited

U.S. PATENT DOCUMENTS

| | | | | |
|---|---|---|---|---|
| 5,355,297 A | * | 10/1994 | Kawabata ............... | H02P 27/14 |
| | | | | 363/43 |
| 5,612,580 A | | 3/1997 | Janonis et al. | |
| 5,715,693 A | | 2/1998 | Walt et al. | |
| 5,818,379 A | | 10/1998 | Kim | |
| 5,973,485 A | | 10/1999 | Kates et al. | |
| 6,031,738 A | * | 2/2000 | Lipo .................... | H02M 7/487 |
| | | | | 363/43 |
| 6,116,048 A | | 9/2000 | Hebert | |
| 6,160,722 A | | 12/2000 | Thommes et al. | |
| 6,201,720 B1 | | 3/2001 | Tracy et al. | |
| 6,374,627 B1 | | 4/2002 | Schumacher et al. | |
| 6,404,655 B1 | | 6/2002 | Welches | |
| 6,574,104 B2 | | 6/2003 | Patel et al. | |
| 6,640,561 B2 | | 11/2003 | Trecate et al. | |
| 6,772,604 B2 | | 8/2004 | Bash et al. | |
| 6,826,922 B2 | | 12/2004 | Patel et al. | |
| 6,859,366 B2 | | 2/2005 | Fink | |
| 6,879,053 B1 | | 4/2005 | Welches et al. | |
| 6,911,801 B2 | | 6/2005 | Youm | |
| 6,924,993 B2 | | 8/2005 | Stancu et al. | |
| 6,950,321 B2 | | 9/2005 | Stancu et al. | |
| 6,980,433 B2 | | 12/2005 | Fink | |
| 7,046,514 B2 | | 5/2006 | Fink et al. | |
| 7,106,590 B2 | | 9/2006 | Chu et al. | |
| 7,173,820 B2 | | 2/2007 | Fink et al. | |
| 7,406,839 B2 | | 8/2008 | Bean et al. | |
| 7,418,825 B1 | | 9/2008 | Bean, Jr. | |
| 7,477,514 B2 | | 1/2009 | Campbell et al. | |
| 7,569,954 B2 | | 8/2009 | Tolle et al. | |
| 7,660,116 B2 | | 2/2010 | Claassen et al. | |
| 7,660,121 B2 | | 2/2010 | Campbell et al. | |
| 7,684,193 B2 | | 3/2010 | Fink et al. | |
| 7,730,731 B1 | | 6/2010 | Bash et al. | |
| 7,738,251 B2 | | 6/2010 | Clidaras et al. | |
| 7,804,687 B2 | | 9/2010 | Copeland et al. | |
| 7,834,606 B2 | | 11/2010 | Liu et al. | |
| 7,855,890 B2 | | 12/2010 | Kashirajima et al. | |
| 7,864,527 B1 | | 1/2011 | Whitted | |
| 7,881,057 B2 | | 2/2011 | Fink et al. | |
| 7,903,404 B2 | | 3/2011 | Tozer et al. | |
| 7,903,409 B2 | | 3/2011 | Patel et al. | |
| 7,907,406 B1 | | 3/2011 | Campbell et al. | |
| 7,957,144 B2 | | 6/2011 | Goettert et al. | |
| 7,963,119 B2 | | 6/2011 | Campbell et al. | |
| 7,974,106 B2 | | 7/2011 | Gurunathan et al. | |
| 8,000,103 B2 | | 8/2011 | Lipp et al. | |
| 8,031,468 B2 | | 10/2011 | Bean, Jr. et al. | |
| 8,093,746 B2 | | 1/2012 | Murali et al. | |
| 8,118,084 B2 | | 2/2012 | Harvey | |
| 8,120,916 B2 | | 2/2012 | Schmidt et al. | |
| 8,146,374 B1 | | 4/2012 | Zien | |
| 8,169,179 B2 | | 5/2012 | Mohan et al. | |
| 8,184,435 B2 | | 5/2012 | Bean, Jr. et al. | |
| 8,189,334 B2 | | 5/2012 | Campbell et al. | |
| 8,199,504 B2 | | 6/2012 | Kashirajima et al. | |
| 8,208,258 B2 | | 6/2012 | Campbell et al. | |
| 8,218,322 B2 | | 7/2012 | Clidaras et al. | |
| 8,261,565 B2 | | 9/2012 | Borror et al. | |
| 8,289,710 B2 | | 10/2012 | Spearing et al. | |
| 8,297,069 B2 | | 10/2012 | Novotny et al. | |
| 8,320,125 B1 | | 11/2012 | Hamburgen et al. | |
| 8,351,200 B2 | | 1/2013 | Arimilli et al. | |
| 8,387,687 B2 | | 3/2013 | Baer | |
| 8,392,035 B2 | | 3/2013 | Patel et al. | |
| 8,405,977 B2 | | 3/2013 | Lin | |
| 8,432,690 B2 | | 4/2013 | Fink et al. | |
| 8,456,840 B1 | | 6/2013 | Clidaras et al. | |
| 8,457,938 B2 | | 6/2013 | Archibald et al. | |
| 8,472,182 B2 | | 6/2013 | Campbell et al. | |
| 8,514,575 B2 | | 8/2013 | Goth et al. | |
| 8,583,290 B2 | | 11/2013 | Campbell et al. | |
| 8,689,861 B2 | | 4/2014 | Campbell et al. | |
| 8,760,863 B2 | | 6/2014 | Campbell et al. | |
| 8,763,414 B2 | | 7/2014 | Carlson et al. | |
| 8,780,555 B2 | | 7/2014 | Fink et al. | |
| 8,783,052 B2 | | 7/2014 | Campbell et al. | |
| 8,797,740 B2 | | 8/2014 | Campbell et al. | |
| 8,813,515 B2 | | 8/2014 | Campbell et al. | |
| 8,816,533 B2 | | 8/2014 | Navarro et al. | |
| 8,817,465 B2 | | 8/2014 | Campbell et al. | |
| 8,817,474 B2 | | 8/2014 | Campbell et al. | |
| 8,824,143 B2 | | 9/2014 | Campbell et al. | |
| 8,839,638 B2 | | 9/2014 | Kashirajima et al. | |
| 8,867,204 B1 | | 10/2014 | Gardner | |
| 8,879,257 B2 | | 11/2014 | Campbell et al. | |
| 9,774,190 B2 | | 9/2017 | Mondal et al. | |
| 9,912,251 B2 | | 3/2018 | Mondal | |
| 9,985,473 B2 | | 5/2018 | Mondal et al. | |
| 2002/0172007 A1 | | 11/2002 | Pautsch | |
| 2003/0061824 A1 | | 4/2003 | Marsala | |
| 2003/0076696 A1 | | 4/2003 | Tsai | |
| 2004/0084965 A1 | | 5/2004 | Welches et al. | |
| 2005/0127853 A1 | | 6/2005 | Su | |
| 2005/0162137 A1 | | 7/2005 | Tracy et al. | |
| 2005/0231039 A1 | | 10/2005 | Hunt | |
| 2006/0067092 A1 | | 3/2006 | Nondahl et al. | |
| 2006/0192522 A1 | * | 8/2006 | Kerkman ............... | H02M 7/48 |
| | | | | 318/812 |
| 2006/0221523 A1 | | 10/2006 | Colombi et al. | |
| 2006/0245216 A1 | | 11/2006 | Wu et al. | |
| 2007/0064363 A1 | | 3/2007 | Nielsen et al. | |
| 2007/0182383 A1 | | 8/2007 | Park et al. | |
| 2007/0210652 A1 | | 9/2007 | Tracy et al. | |
| 2007/0227710 A1 | | 10/2007 | Belady et al. | |
| 2008/0130332 A1 | | 6/2008 | Taimela et al. | |
| 2008/0239775 A1 | | 10/2008 | Oughton et al. | |
| 2008/0298106 A1 | | 12/2008 | Tateishi | |
| 2008/0304300 A1 | | 12/2008 | Raju et al. | |
| 2009/0021082 A1 | | 1/2009 | Loucks et al. | |
| 2009/0051344 A1 | | 2/2009 | Lumsden | |
| 2009/0086428 A1 | | 4/2009 | Campbell et al. | |
| 2009/0154096 A1 | | 6/2009 | Iyengar et al. | |
| 2009/0212631 A1 | | 8/2009 | Taylor et al. | |
| 2009/0302616 A1 | | 12/2009 | Peterson | |
| 2009/0315404 A1 | | 12/2009 | Cramer et al. | |
| 2010/0032142 A1 | | 2/2010 | Copeland et al. | |
| 2010/0094472 A1 | | 4/2010 | Woytowitz et al. | |
| 2010/0136895 A1 | | 6/2010 | Sgro | |
| 2010/0156376 A1 | | 6/2010 | Fu et al. | |
| 2010/0172161 A1 | * | 7/2010 | Tallam .................... | H02M 1/44 |
| | | | | 363/37 |
| 2010/0201194 A1 | | 8/2010 | Masciarelli et al. | |
| 2010/0264882 A1 | | 10/2010 | Hartular et al. | |
| 2010/0300650 A1 | | 12/2010 | Bean, Jr. | |

(56)　　　References Cited

U.S. PATENT DOCUMENTS

| | | |
|---|---|---|
| 2010/0320989 A1 | 12/2010 | Chang et al. |
| 2011/0198057 A1 | 8/2011 | Lange et al. |
| 2011/0265983 A1 | 11/2011 | Pedersen |
| 2011/0278934 A1 | 11/2011 | Ghosh et al. |
| 2011/0313576 A1 | 12/2011 | Nicewonger |
| 2012/0103591 A1 | 5/2012 | Tozer |
| 2012/0147639 A1 | 6/2012 | Mao et al. |
| 2012/0174612 A1 | 7/2012 | Madara et al. |
| 2014/0009988 A1 | 1/2014 | Valiani |
| 2014/0016382 A1 | 1/2014 | Teo et al. |

OTHER PUBLICATIONS

Communication pursuant to Article 94(3) EPC issued in corresponding European Application No. 15790397.2 dated Mar. 19, 2019, 6 pages.
Communication pursuant to Article 94(3) EPC issued in European Patent Application No. 15790397.2 dated Dec. 12, 2019, 9 pages.
Extended European Search Report issued in European Patent Application No. 21161509.1 dated May 21, 2021.
Eyyup Demirkutlu et al: "Output Voltage Control of A Four-Leg Inverter Based Three-Phase UPS by Means of Stationary Frame Resonant Filter Banks", Electric Machines&Drives Conference, 2007. IEMDC '07. IEEE International, IEEE, Piscataway, NJ, USA, May 1, 2007 (May 1, 2007), pp. 880-885.
International Search Report in corresponding PCT application No. PCT/US2015/056785, dated Feb. 2, 2016, 4 pages.
Lima E F F et al: FPGA implementation of Space Vector PWM algorithm for multilevel inverters using non-orthogonal moving reference "frame", Electric Machines and Drives Conference, 2009. IEMDC '09. IEEE International, IEEE, Piscataway, NJ, USA, May 3, 2009 (May 3, 2009), pp. 709-716.
S K Mondal, B K Bose, V Oleschuk and J O P Pinto, "Space Vector Pulse Width Modulation of Three-Level Inverter Extending Operation Into Overmodulation Region," IEEE Trans. on Power Elect. vol. 18, pp. 604-611, Mar. 2003.
S K Mondal, J O P Pinto, and B K Bose, "A Neural-Network-Based Space-Vector PWM controller for a Three-Level Voltage-fed Inverter Induction Motor Drive," IEEE Trans. Ind. Application, vol. 38, pp. 660-669, May/Jun. 2002.
Saad Mekhilef et al., "Novel Vector Control Method for Three-Stage Hybrid Cascaded Multilevel Inverter", IEEE Transactions on Industrial Electronics, vol. 58, No. 4, Apr. 1, 2011.
Saad Mekhilef et al: "Novel Vector Control Method for Three-Stage Hybrid Cascaded Multi level Inverter", IEEE Transactions on Industrial Electronics, vol. 58, No. 4, Apr. 1, 2011 (Apr. 1, 2011), pp. 1339-1349.

* cited by examiner

SYSTEMS AND METHODS FOR CONTROLLING MULTI-LEVEL DIODE-CLAMPED INVERTERS USING SPACE VECTOR PULSE WIDTH MODULATION (SVPWM)

BACKGROUND

The present disclosure generally relates to Space Vector PWM (SVPWM) control for multi-level diode-clamped inverters for various applications including Data Center (DC) applications.

DCs are one of the largest and fastest growing consumers of electricity in the world. In 2013, DCs in the U.S. consumed an estimated 91 billion kWhr of electricity, which is enough electricity to power all the households in New York City twice over. And the DCs in the U.S. are on track to consume an estimated 140 billion kWhr by 2020.

A Multi-level Medium Voltage Data Center Static Synchronous Compensator (DCSTATCOM) or a Multi-level Medium Voltage Uninterruptable Power Supply (MVUPS) with battery energy storage may be employed to ensure a reliable supply of power to DCs. DCSTATCOM or MVUPS connected in a shunt configuration at a point of common coupling (PCC) to a data center (DC) load, enables independent simultaneous control capability of both active (to provide UPS functionality, grid energy storage, and peak demand load supply) and reactive (to provide Power Factor (PF) correction, grid voltage stiffness, and transient stabilizer functions) power compensation for both DC and grid stabilization.

Multi-level voltage-fed PWM inverters are showing popularity in multi-megawatt DCSTATCOM or MVUPS applications due to easy sharing of large voltages between the series-connected IGBT devices and improvement of harmonic quality at the output compared to the existing two-level inverters with transformer systems.

SUMMARY

In aspects, the present disclosure features a control system for a multi-level inverter. The control system includes a digital logic circuit, a digital up/down counter, a processor, and memory. The digital logic circuit includes digital logic comparators, which include a first comparator and a second comparator, inverters, which include a first inverter, coupled to respective outputs of respective comparators, and AND gates including an AND gate having a first input and a second input. The first input is coupled to the output of the first inverter and the second input is coupled to the output of the second comparator. The control system further includes a digital up/down counter coupled to first inputs of the comparators. The up/down counter counts from 0 to Ts/2 and then from Ts/2 to 0 where Ts is the sampling period.

The control system further includes a processor and memory that identify a sector location based on an actual angle of a reference voltage vector, convert the actual angle into a converted angle located in a first sector, identify a reference region location based on the magnitude of the reference voltage vector and the converted angle in the first sector, select a switching sequence and turn-on time values based on the corresponding actual region location and actual sector, and transmit turn-on signal values to second inputs of the plurality of comparators to generate switching signals for IGBT drivers of a multi-level inverter.

In aspects, the digital logic circuit is a Field Programmable Gate Array (FPGA) or an Application Specific Integrated Circuit (ASIC). In aspects, the processor is a digital signal processor (DSP).

In aspects, the number of the comparators and the number of the inverters is one less than the number of levels of the multi-level inverter. In aspects, the number of the AND gates is one less than the number of the comparators.

In aspects, the processor and memory are further configured to convert the reference voltage vector and the converted angle into X and Y coordinate point values in the first sector, and identify a region location based on the X and Y coordinate point values.

In aspects, the multi-level inverter is a five-level inverter, the comparators further include a third comparator and a fourth comparator, the inverters further include a second inverter, a third inverter, and a fourth inverter, the AND gates further include a second AND gate and a third AND gate, a first input of the second AND gate is coupled to the output of the second inverter and a second input of the second AND gate is coupled to the output of the third comparator, a first input of the third AND gate is coupled to the output of the third inverter and a second input of the third AND gate is coupled to the output of the fourth comparator, and the output of the first comparator, the outputs of the plurality of AND gates, and the output of the fourth inverter provide the switching signals, which are transmitted to gate drivers for driving power transistors of the multi-level inverter.

In aspects, the multi-level inverter is a four-level inverter, the comparators further include a third comparator, the inverters further include a second inverter and a third inverter, the plurality of AND gates further include a second AND gate, a first input of the second AND gate is coupled to the output of the second inverter and a second input of the second AND gate is coupled to the output of the third comparator, and the output of the first comparator, the outputs of the plurality of AND gates, and the output of the third inverter provide the switching signals.

In aspects, identifying a region location includes comparing the X and Y coordinate point values to segments of triangles, which represent regions, in a vector space.

In aspects, the turn-on time values and switching sequence are predetermined for each sector and region, and stored in a look-up table stored in the memory.

In aspects, the present disclosure features a method of controlling a multi-level inverter. The method includes identifying a sector location based on an actual angle of a reference voltage vector, converting the actual angle into a converted angle located in a first sector, identifying a region location based on the magnitude of the reference voltage vector and the converted angle in the first sector, selecting a switching sequence and turn-on signal values based on the corresponding region location in actual sector of reference voltage vector, transmitting turn-on time values to second inputs of the comparators to generate switching signals, which are transmitted to gate drivers for driving power transistors of the multi-level inverter, comparing each of the turn-on signals to a digital up/down counter signal to obtain comparison signals including a first comparison signal and a second comparison signal, inverting the comparison signals to obtain inverted signals including a first inverted signal, and performing a logical AND operation on the first inverted signal and the second comparison signal to obtain a switching signal for a corresponding driver that drives a power transistor of a multi-level inverter.

In aspects, the method further includes converting the reference voltage vector and the converted angle into X and Y coordinate point values, and identifying a region location based on the X and Y coordinate point values.

In aspects, identifying a region location includes comparing the X and Y coordinate point values to segments of triangles, which represent regions, in a vector space.

In aspects, the turn-on time values and switching sequences are predetermined for each sector and region, and stored in a look-up table stored in memory.

In aspects, the first comparison signal is a first gate drive switching signal (to generate either P2 or N2 switching states), the logical AND operation is performed on the first inverted signal and the second comparison signal to obtain a second switching signal (to generate either P1 or N1 switching states), the comparison signals further include a third comparison signal and a fourth comparison signal, the inverted signals further include a second inverted signal, a third inverted signal, and a fourth inverted signal, the method further includes performing a second logical AND operation on the second inverted signal and the third comparison signal to obtain a third switching signal (to generate O switching states), and performing a second logical AND operation on the second inverted signal and the third comparison signal to obtain a fourth switching signal (to generate either $N_1$ or $P_1$ switching states), and the fourth inverted signal is a fifth switching signal (to generate either $N_2$ or $P_2$ switching states).

In aspects, the present disclosure features an energy storage system including an energy storage device, a DC-DC converter coupled to the energy storage device, a multi-level inverter coupled to the DC-DC converter, and a multi-level inverter controller coupled to the multi-level inverter. The multi-level inverter controller includes a digital logic circuit. The digital logic circuit includes comparators including a first comparator and a second comparator, inverters, including a first inverter, coupled to respective outputs of respective comparators, and AND gates including a first AND gate having a first input and a second input. The first input is coupled to the output of the first inverter and the second input is coupled to the output of the second comparator. The multi-level inverter controller further includes a counter coupled to first inputs of the plurality of comparators and a processor and memory. The processor and memory identify a sector location based on an actual angle of a reference voltage vector, convert the actual angle into a converted angle located in a first sector, identify a region location based on the magnitude of the reference voltage vector and the converted angle in the first sector, select a switching sequence and turn-on signal values based on the corresponding region and actual reference voltage vector location, and transmit turn-on signal values to second inputs of the plurality of comparators to generate switching signals, which are transmitted to gate drivers for driving power transistors of the multi-level inverter.

DETAILED DESCRIPTION

Figure 1:
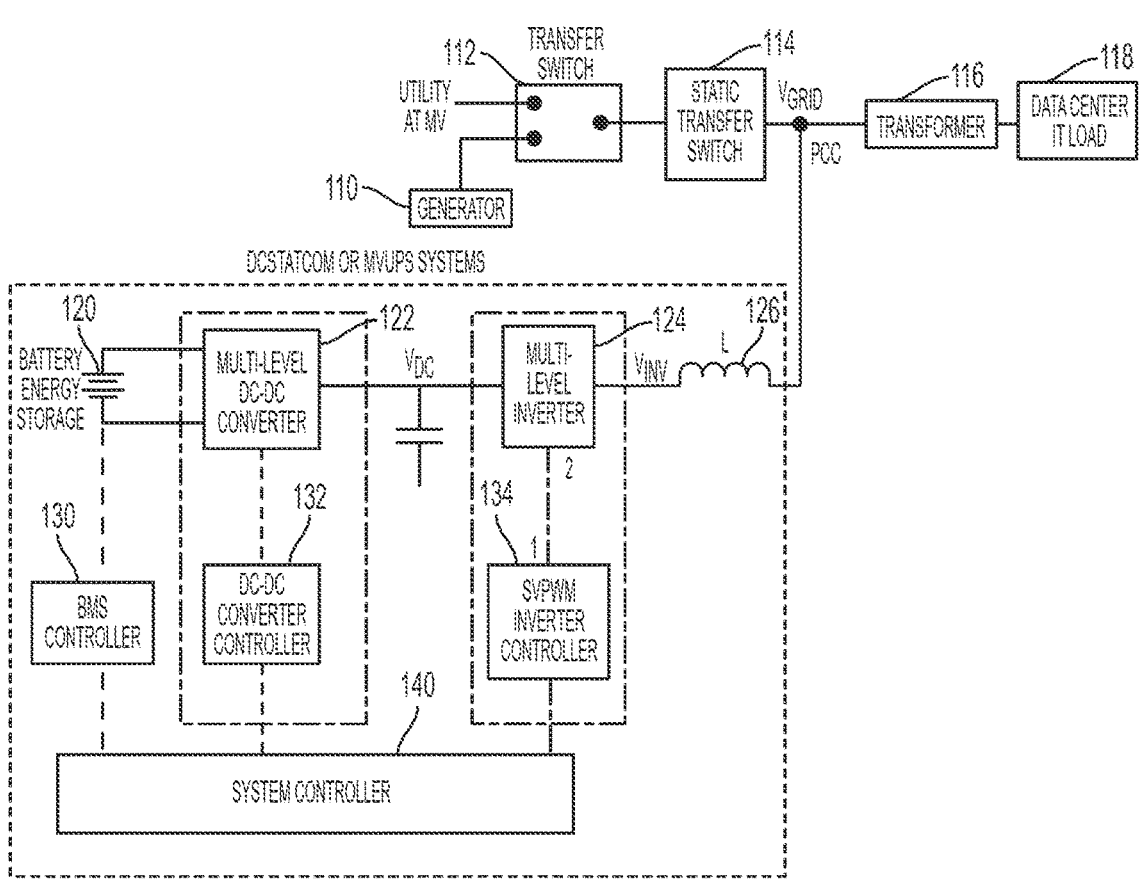
FIG. 1 is a system block diagram of a data center power supply system according to embodiments of the present disclosure.

The present disclosure relates to a processor and digital logic circuit-based hybrid controller and its implementation of SVPWM control strategies for multi-level diode-clamped inverters, e.g., multi-level diode-clamped inverters for Multi-level Medium Voltage Data Center Static Synchronous Compensator (DCSTATCOM) or Multi-level Medium Voltage Uninterruptable Power Supply (MVUPS) with battery energy storage for a data center (DC) load connected at a medium voltage (MV) level. MV operation reduces overall losses of DC components and hence improves overall efficiency of the system.

A control system of the present disclosure includes a digital logic circuit, such as a Field Programmable Gate Array (FPGA), and a processor, such as a digital signal processor (DSP) or a microprocessor. The processor samples a reference voltage vector $V^*$ and an angle $\theta_e^*$, and identifies a sector and region based on the sampled reference voltage vector $V^*$ and angle $\theta_e^*$. The processor then selects predefined switching sequences and pre-calculated turn-on time values based on the identified sector and region location of the reference voltage vector $V^*$. The digital logic circuit generates PWM switching signals for driving power transistors of a multi-level diode-clamped inverter based on the turn-on time values and the selected switching sequences.

For multi-level inverters, the SVPWM control strategy is more suitable in comparison to sinusoidal PWM as the SVPWM control strategy offers significant flexibility to synthesize switching sequences of waveforms and is suitable for digital implementation by a processor, e.g., a DSP, and a digital logic circuit, e.g., an FPGA, forming a hybrid controller.

In SVPWM, the inverter voltage vectors, which correspond to the apexes of the triangle, which includes the reference voltage vector, are generally selected to minimize harmonics at the output in comparison to sinusoidal PWM. SVPWM also provides larger under modulation range that extends the modulation factor to 90.7% from the traditional value of 78.5% in sinusoidal PWM.

In the control systems of the present disclosure, a hybrid controller, which includes a processor and a digital logic circuit, is utilized to implement various control blocks to carry out the SVPWM control strategy. The PWM signal generation task for providing PWM switching signals to the gate driver for driving a power transistor is carried out by a digital logic circuit, e.g., an FPGA. The remaining tasks are performed by a processor, e.g., a DSP. Therefore, a less expensive hybrid processor and digital logic controller is used to implement an overall complex control strategy. Also, the control tasks are divided between a processor and a digital logic circuit to achieve a faster transient response at lower cost.

The systems and methods of the present disclosure may be applied to a Multi-level Medium Voltage Data Center Static Synchronous Compensator (DCSTATCOM) or Multi-level Medium Voltage Uninterruptable Power Supply (MVUPS), as described in U.S. application Ser. No. 14/481, 904, entitled "Multi-level Medium Voltage Data Center Static Synchronous Compensator (DCSTATCOM) for Active and Reactive Power Control of Data Centers connected with Grid Energy Storage and Smart Green Distributed Energy Sources", filed on Sep. 9, 2014, and U.S. application Ser. No. 14/594,073, entitled "Transformerless Multi-level Medium Voltage Uninterruptable Power Supply (UPS) System", filed on Jan. 9, 2015, each of which are incorporated herein by reference in their entireties.

FIG. 1 is a system block diagram of a DCSTATCOM or MVUPS topology with a transfer switch 112 connected diode-clamped configuration to generate three phases U, V, and W of an AC voltage $V_{AC}$. State O represents neutral point balancing so that the average current injected at O should be zero. States P1 and P2 represent positive bus voltages. States N1 and N2 represent negative bus voltages.

Switches $S_{1U}$-$S_{8U}$, $S_{1V}$-$S_{8V}$, and $S_{1W}$-$S_{8W}$ may be power transistors, such as IGBTs. IGBTs allow for higher voltages or currents and higher switching frequencies. The five-level inverter illustrated in FIG. 2 allows for sharing of the high voltage among the switches $S_{1U}$-$S_{8U}$, $S_{1V}$-$S_{8V}$, and $S_{1W}$-$S_{8W}$, and reduces harmonic distortion.

Figure 2:
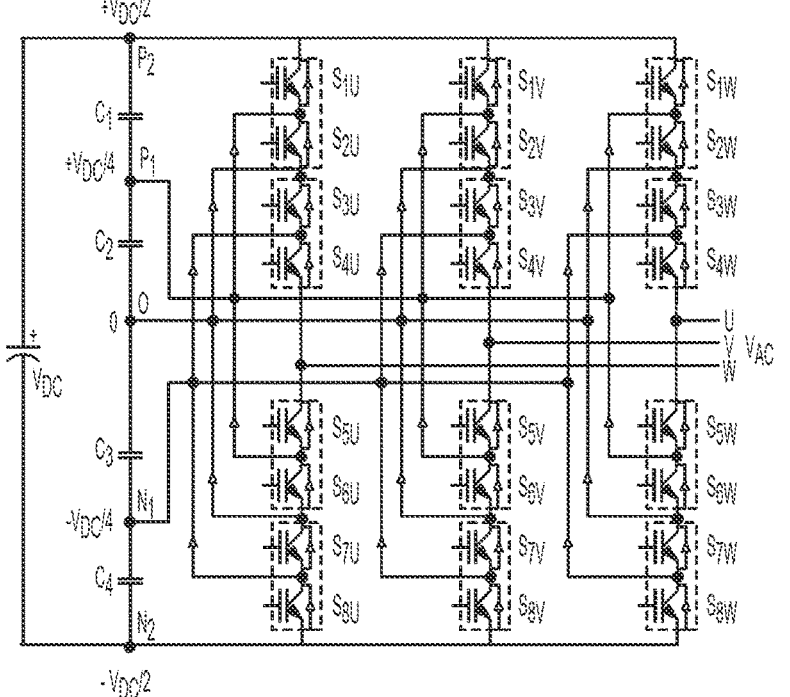
FIG. 2 is a circuit diagram of a three-phase five-level diode-clamped inverter according to embodiments of the present disclosure.

The complexity of an inverter control system increases as the inverter level increases from three to five or above. A three-phase five-level diode-clamped inverter illustrated in FIG. 2 is complex due to a high number of switching states, i.e., $5^3$=125 switching states, in comparison to a three-phase three-level inverter with a lower number of switching states, i.e., $3^3$=27 switching states. The inverter must have a very fast response time (in micro-seconds) to have appropriate control operation and safety aspects for IGBT devices. Also, the SVPWM strategy needs to perform many on-line calculations due to its large number of switching states (e.g., 125 for a five-level inverter) and large number of operating regions/triangles (e.g., 96 for a five-level inverter). Therefore, in embodiments, the control systems of the present disclosure incorporate a digital logic circuit, such as an FPGA, to perform partial logic functions. The digital logic circuit may form part of a hybrid controller, which includes a processor and the digital logic circuit. This hybrid controller is well suited to implement SVPWM control because it allows for much larger bandwidth control and provides faster response times.

The switching states of the five-level inverter are summarized in Table 1, where X is one of the phases U, V, and W; and $P_2$ (+$V_{DC}$/2), $P_1$ (+$V_{DC}$/4), O (0 $V_{DC}$), $N_1$ (−$V_{DC}$/4), and $N_2$ (−$V_{DC}$/2) are DC-bus points as shown in FIG. 2.

TABLE 1

| Switching States | $S_{1X}$ | $S_{2X}$ | $S_{3X}$ | $S_{4X}$ | $S_{5X}$ | $S_{6X}$ | $S_{7X}$ | $S_{8X}$ | $V_{XO}$ |
|---|---|---|---|---|---|---|---|---|---|
| $P_2$ | ON | ON | ON | ON | OFF | OFF | OFF | OFF | +$V_{DC}$/2 |
| $P_1$ | OFF | ON | ON | ON | ON | OFF | OFF | OFF | +$V_{DC}$/4 |
| O | OFF | OFF | ON | ON | ON | ON | OFF | OFF | 0 |
| $N_1$ | OFF | OFF | OFF | ON | ON | ON | ON | OFF | −$V_{DC}$/4 |
| $N_2$ | OFF | OFF | OFF | OFF | ON | ON | ON | ON | −$V_{DC}$/2 | between a utility and a generator 110, a static transfer switch 114, a transformer 116, and a DC IT load 118. The DCSTATCOM or MVUPS systems include a battery energy storage block 120, a battery management system (BMS) controller 130, a bi-directional multi-level (ML) DC-DC converter 122, a DC-DC converter controller 132, a ML inverter 124 outputting medium voltage AC ($V_{INV}$) at the inverter output, and an SVPWM inverter controller 134 for controlling the ML inverter 124. As described in more detail below, the SVPWM inverter controller 134 includes a processor and a digital logic circuit for generating PWM switching signals, which are applied to driver circuits (not shown) for driving power transistors (not shown) of the ML inverter 124.

FIG. 2 is a circuit block diagram of a five-level diode-clamped inverter, which may be used as the ML inverter 124, which converts DC voltage $V_{DC}$ output from the converter 122 to three-phase AC voltage $V_{AC}$. The five-level inverter includes power transistors or switches $S_{1U}$-$S_{8U}$, $S_{1V}$-$S_{8V}$, and $S_{1W}$-$S_{8W}$, and diodes connected together in a Referring to Table 1, in conjunction with FIG. 2, phase U, for example, is in state P2 (positive bus voltage) when the switches $S_{1U}$-$S_{4U}$ are closed or "ON", and switches $S_{5U}$-$S_{8U}$ are open or "OFF". The phase V is in state P1 (positive bus voltage that is less than P2) when switches $S_{1U}$ and $S_{6U}$-$S_{8U}$ are open or OFF, and switches $S_{2U}$-$S_{5U}$ are closed or ON. The phase U is in state O when switches $S_{1U}$, $S_{2U}$, $S_{7U}$, and $S_{8U}$ are open or OFF and switches $S_{3U}$-$S_{6U}$ are closed or ON.

The phase U is in state N1, which corresponds to a negative bus voltage that is greater than a negative bus voltage that corresponds to state N2, when switches $S_{1U}$-$S_{3U}$ and $S_{8U}$ are turned off (i.e., open) and switches $S_{4U}$-$S_{7U}$ are turned on (i.e., closed). The phase U is in state N2, which corresponds to a negative bus voltage that is less than the negative bus voltage that corresponds to state N1, when switches $S_{1U}$-$S_{4U}$ are turned off (i.e., open) and switches $S_{5U}$-$S_{8U}$ are turned on (i.e., closed).

Figure 3A:
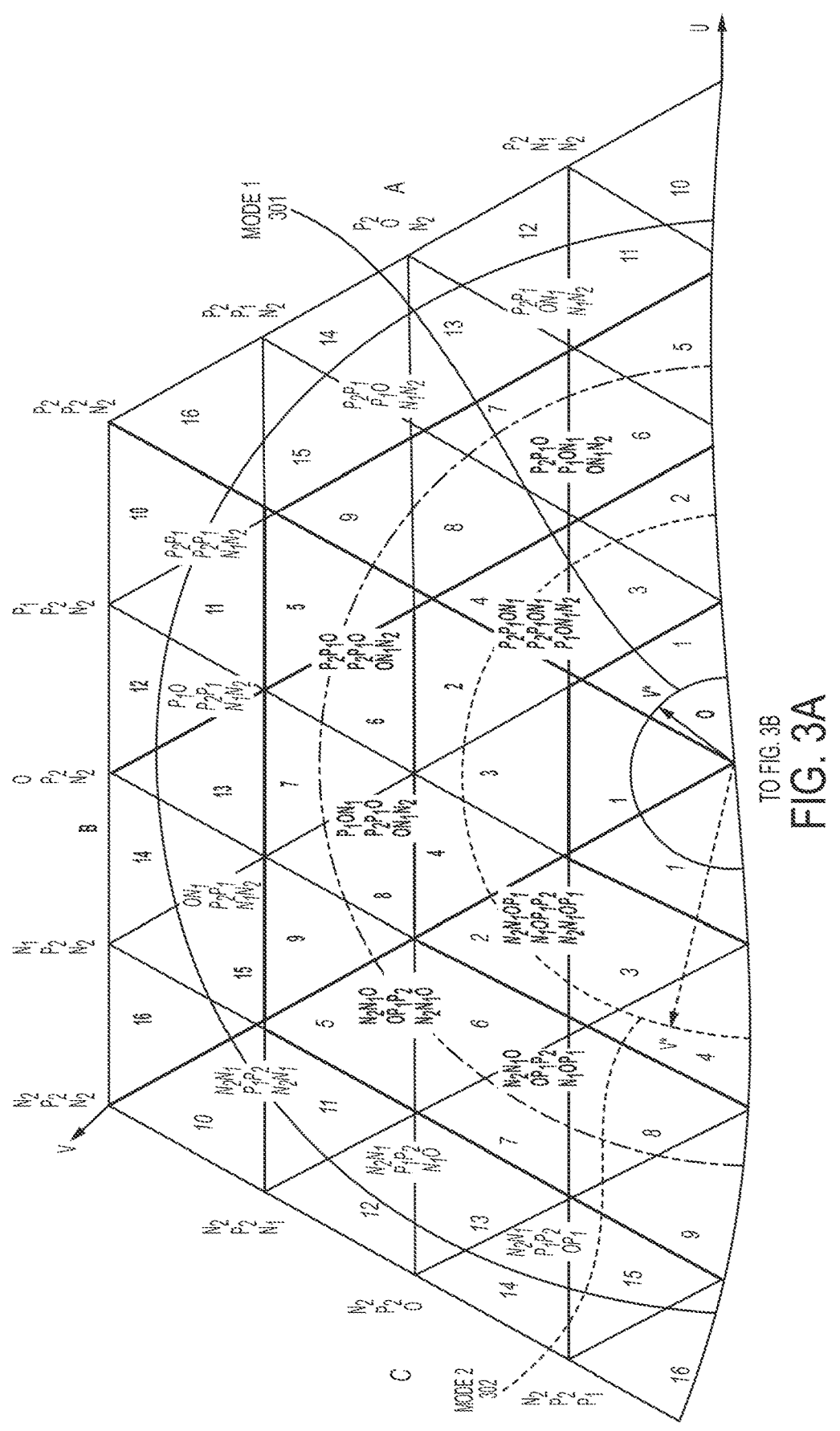
FIGS. 3A and 3B show a space vector diagram illustrating space voltage vectors of a three-phase five-level inverter according to embodiments of the present disclosure.
Figure 3B:
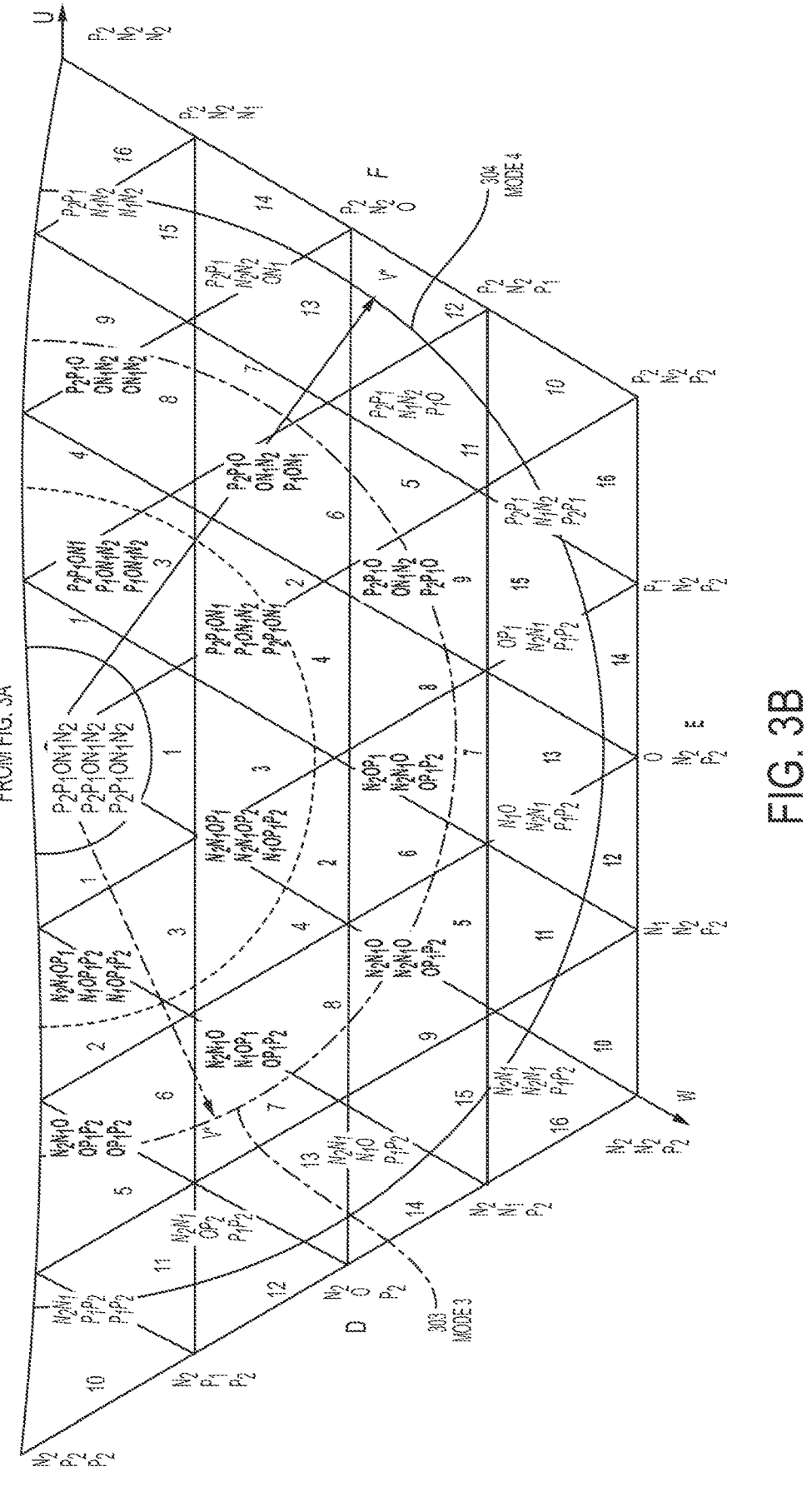

FIGS. 3A and 3B show a space vector diagram illustrating space voltage vectors of a five-level diode-clamped inverter with 125 switching states and 96 operational triangles. There are 120 active switching states and the remaining 5 are zero states ($P_2P_2P_2$, $P_1P_1P_1$, OOO, $N_1N_1N_1$, $N_2N_2N_2$) that lie at the origin. FIGS. 3A and 3B also show a hexagon having six sectors—sectors A-F, and each sector has sixteen regions—regions 1-16, giving altogether 96 regions of operation.

In embodiments, the operation of a multi-level inverter, such as the multi-level inverter of FIG. 2, may be divided into multiple modes. As shown in FIGS. 3A and 3B, the operation is divided into four modes—modes 1-4. In Mode 1 (301), the command voltage vector V* trajectory covers region 1 of all six sectors, e.g., sectors A-F. In Mode 2 (302), the command voltage vector V* trajectory covers regions 2, 3, and 4 of all sectors. In Mode 3 (303), the command voltage vector V* trajectory covers regions 5, 6, 7, 8, and 9 of all sectors. In Mode 4 (304), the command voltage vector V* trajectory covers regions 10, 11, 12, 13, 14, 15, and 16 of all sectors.

Operational Modes

Figures 4, 5:
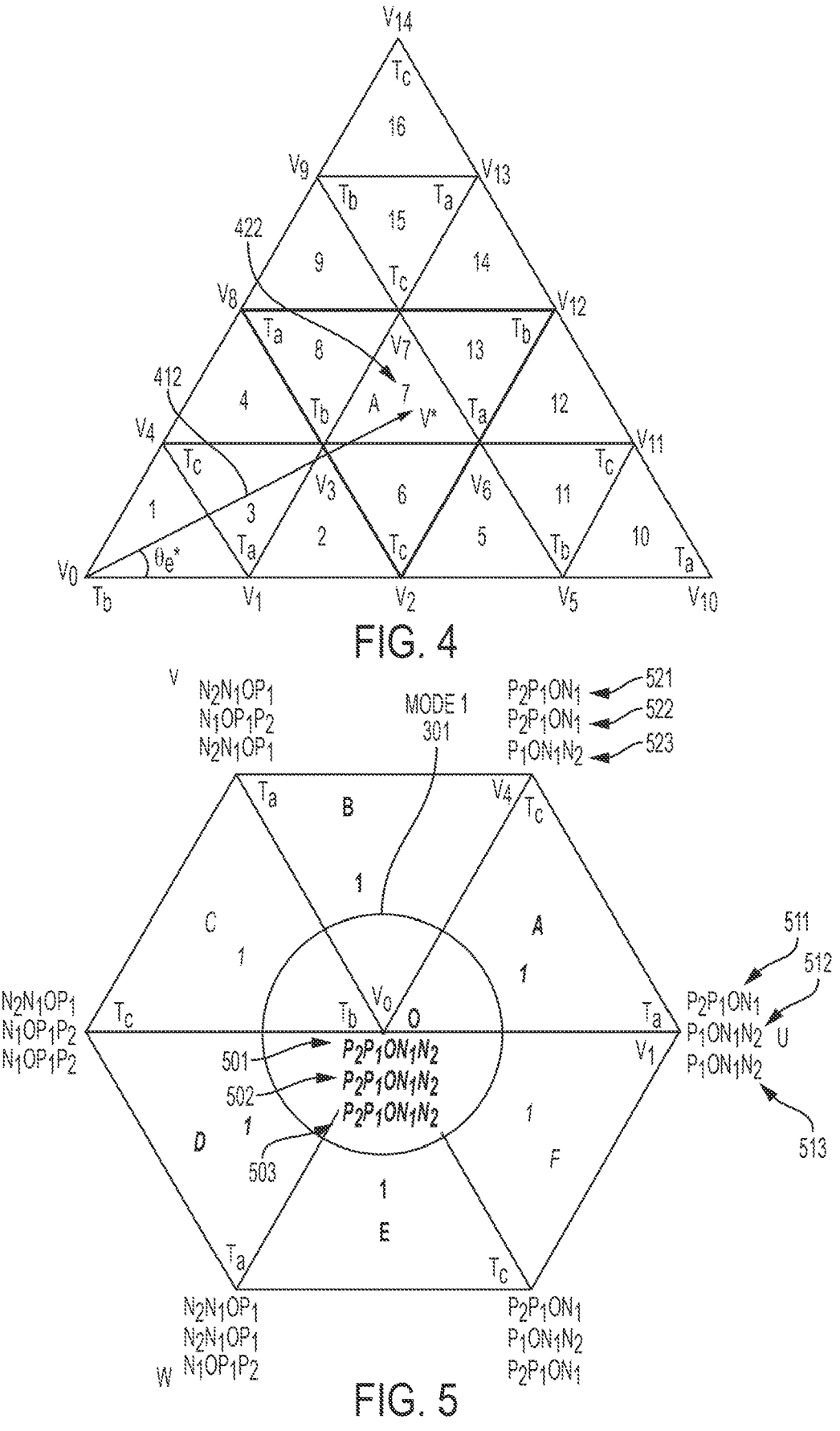
FIG. 4 is a space vector diagram illustrating space vectors indicating regions and switching times according to embodiments of the present disclosure.
FIG. 5 is a space vector diagram illustrating switching states and switching times of region 1 and sectors A-F for an example mode according to embodiments of the present disclosure.

FIG. 4 is a space vector diagram illustrating a sector A triangle formed by voltage vectors $V_0$, $V_{10}$, and $V_{14}$. In Space Vector Pulse Width Modulation (SVPWM), the inverter voltage vectors $V_3$, $V_6$, and $V_7$, which correspond to the apexes of the region 7 of the sector A triangle, which includes the reference or command voltage vector (V*) 412, are generally selected to minimize harmonics at the output of the multi-level inverter. If the command voltage vector V* lies in region 7 (422), as shown in FIG. 4, the following two equations are satisfied for SVPWM:

$$V_6 T_a + V_3 T_b + V_7 T_c = V * T_S \qquad (1)$$

$$T_a + T_b + T_c = T_S \qquad (2)$$

where $T_a$, $T_b$, and $T_c$ are respective time intervals of the nearest three voltage vectors in a particular triangle, and $T_S$ is the sampling time.

FIG. 5 is a space vector diagram illustrating switching states and switching times of the three phases of region 1 and sectors A-F in Mode 1.

In embodiments, the switching sequence is pre-defined (and may be stored in a look-up table in memory) and depends on the location of reference voltage vector (V*) in any particular region or triangle. The sequence in opposite sectors, e.g., A-D, B-E, and C-F, is selected to be of a complimentary nature to achieve capacitor neutral voltage balancing.

Figure 6:
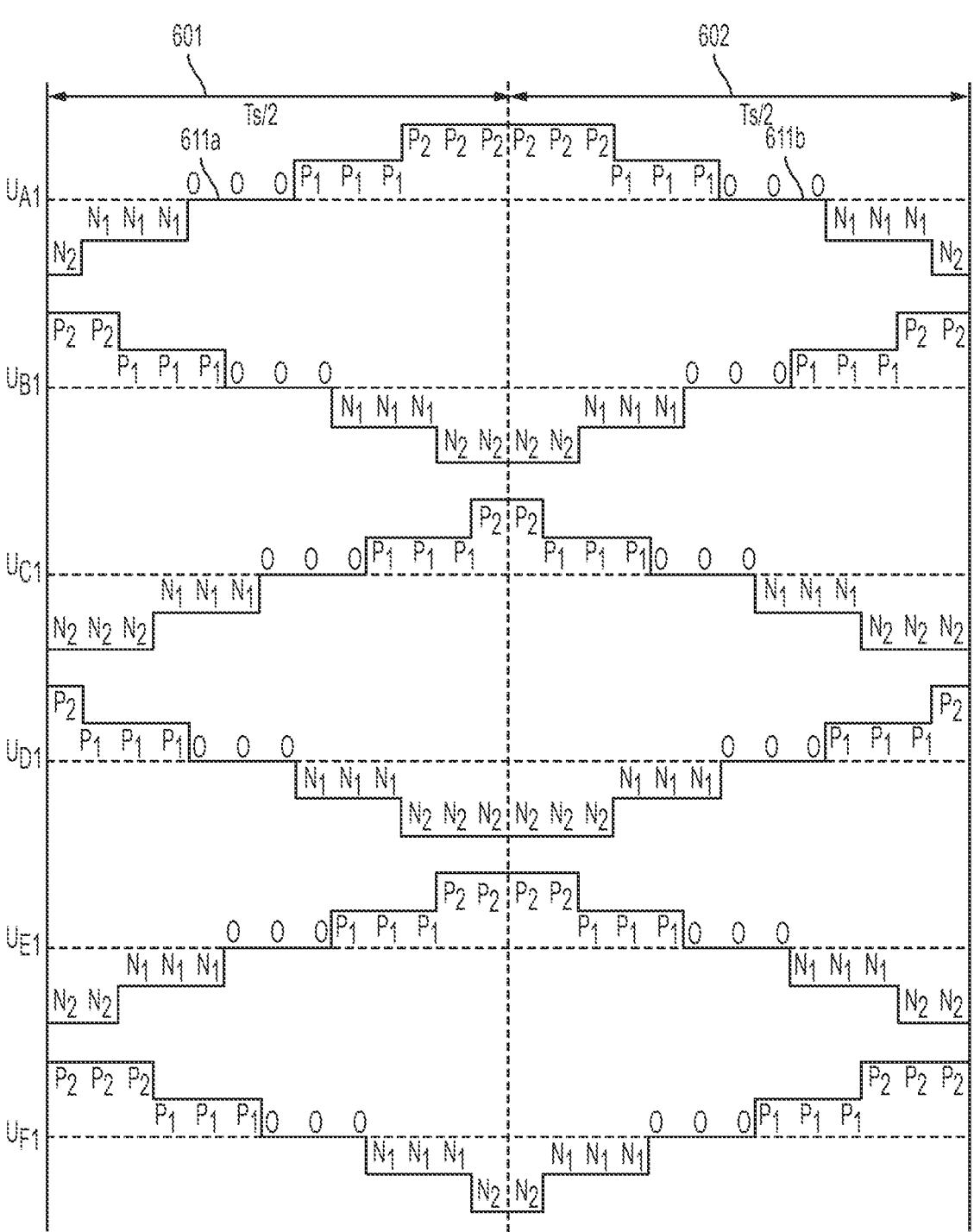
FIG. 6 is a waveform diagram illustrating switching states for one phase of sectors A-F and region 1.

FIG. 6 is a waveform diagram showing the construction of AC voltage waveform patterns based on the sequences of switching states ($P_2$, $P_1$, O, $N_1$, $N_2$) of the U phase in region 1 of sectors A-F ($U_{A1}$-$U_{F1}$) for Mode 1 operation. The sequences of switching states are obtained from the space vector diagram of FIG. 5 where the switching states for the three phases are defined at each of the voltage vectors. The first row 501 of switching states for voltage vector $V_0$ are switching states for the U phase, the second row 502 of switching states for voltage vector $V_0$ are switching states for the V phase, and the third row 503 of switching states for voltage vector $V_0$ are switching states for the W phase. Likewise, the first row 511 of switching states for voltage vector $V_1$ are switching states for the U phase, the second row 512 of switching states for voltage vector $V_1$ are switching states for the V phase, and the third row 513 of switching states for voltage vector $V_1$ are switching states for the W phase. Further, the first row 521 of switching states for voltage vector $V_4$ are switching states for the U phase, the second row 522 of switching states for voltage vector $V_4$ are switching states for the V phase, and the third row 523 of switching states for voltage vector $V_4$ are switching states for the W phase.

To construct the first half of the sequence of switching states for phase U, sector A, region 1 ($U_{A1}$) (611a) over sampling period Ts/2 (601), switching states are obtained from each of the voltage vectors in a counter-clockwise direction. The switching states are obtained from right to left in the first row of switching states assigned to each of the voltage vectors.

For example, the first switching state of the sequence $U_{A1}$ is the right-most switching state in the first row 501 for voltage vector $V_0$, which is $N_2$. The second switching state of the sequence $U_{A1}$ is the right-most switching state in the first row 511 for voltage vector $V_1$, which is $N_1$. The third switching state of the sequence $U_{A1}$ is the right-most switching state in the first row 521 for voltage vector $V_4$, which is $N_1$. The fourth switching state of the sequence $U_{A1}$ is the second switching state from the right in the first row 501 for voltage vector $V_0$, which is $N_1$. The fifth switching state of the sequence $U_{A1}$ is the second switching state from the right in the first row 511 for voltage vector $V_1$, which is O. The sixth switching state of the sequence $U_{A1}$ is the second switching state from the right in the first row 521 for voltage vector $V_4$, which is O. The seventh switching state of the sequence $U_{A1}$ is the third switching state from the right in the first row 501 for voltage vector $V_0$, which is O.

The eighth switching state of the sequence $U_{A1}$ is the third switching state from the right in the first row 511 for voltage vector $V_1$, which is $P_1$. The ninth switching state of the sequence $U_{A1}$ is the third switching state from the right in the first row 511 for voltage vector $V_1$, which is $P_1$. The tenth switching state of the sequence $U_{A1}$ is the third switching state from the right in the first row 521 for voltage vector $V_4$, which is $P_1$. The eleventh switching state of the sequence $U_{A1}$ is the fourth switching state from the right in the first row 501 for voltage vector $V_0$, which is $P_1$.

The twelfth switching state of the sequence $U_{A1}$ is the fourth switching state from the right in the first row 511 for voltage vector $V_1$, which is $P_2$. The thirteenth switching state of the sequence $U_{A1}$ is the fourth switching state from the right in the first row 521 for voltage vector $V_4$, which is $P_2$. The fourteenth switching state of the sequence $U_{A1}$ is the fifth switching state from the right in the first row 501 for voltage vector $V_0$, which is $P_2$.

To construct the second half of the sequence of switching states for phase U, sector A, region 1 ($U_{A1}$) (611b) over sampling period Ts/2 (602), switching states are obtained from each of the voltage vectors in a clockwise direction. The switching states are obtained from left to right in the first row of switching states assigned to the voltage vectors.

Figure 7:
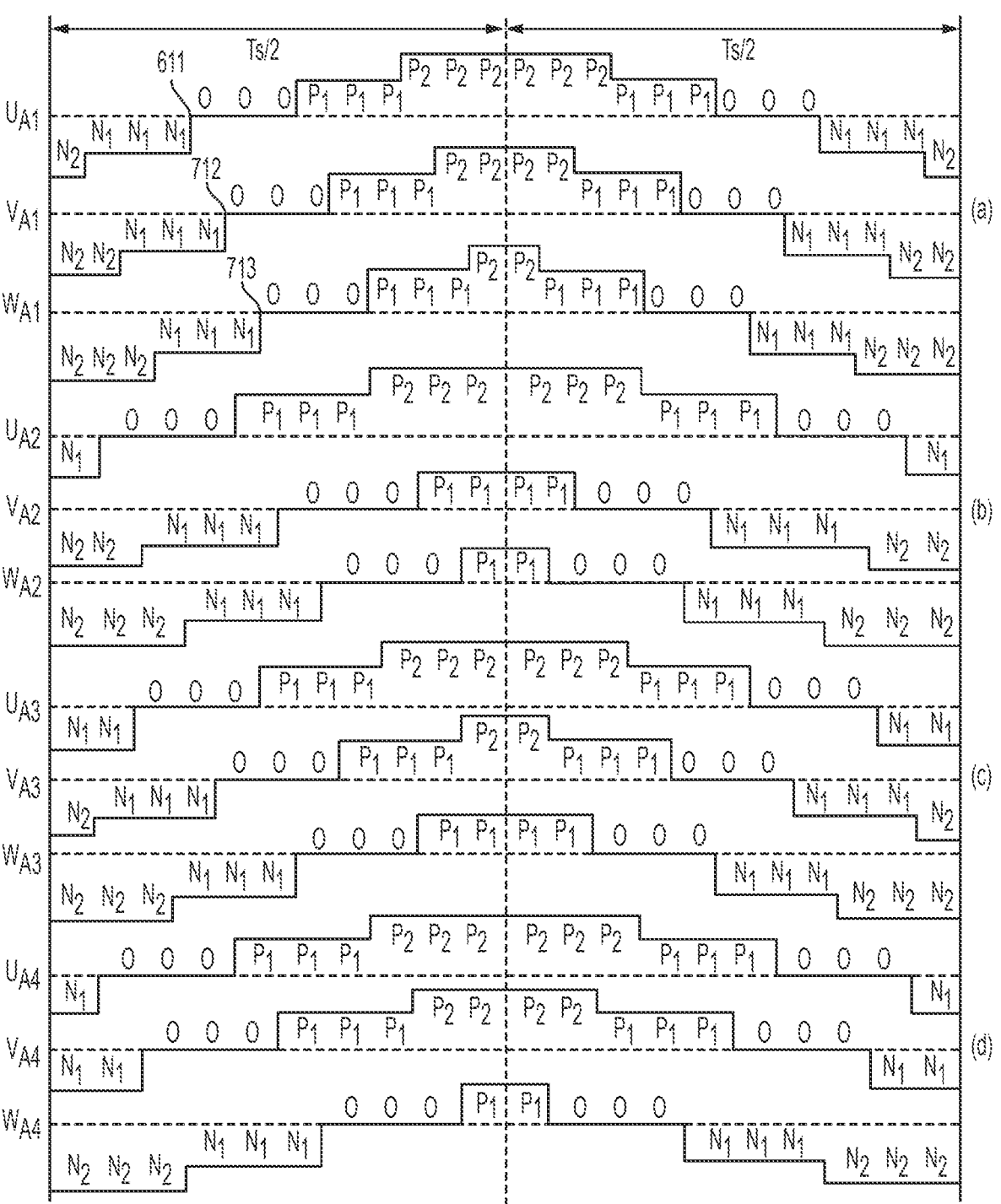
FIG. 7 is a waveform diagram illustrating a sequence of switching states of the three phases in regions 1-4 of sector A according to embodiments of the present disclosure.

FIG. 7 is a waveform diagram illustrating the construction of AC voltage waveform patterns based on the vector space diagram of FIGS. 3A and 3B in a manner similar to that described above with respect to FIG. 6. FIG. 7 shows AC voltage waveform patterns for a sequence of switching states, e.g., $P_2$, $P_1$, O, $N_1$, $N_2$, of the three phases U, V, and W in regions 1-4 of sector A for operational modes 1 and 2. The AC voltage waveform patterns include waveform patterns $U_{A1}$ (611), $V_{A1}$ (712), and $W_{A1}$ (713), which were constructed based on the switching states obtained from region 1 in sector A.

Determination of Turn-on Times

PWM waveforms are established once switching turn-on time information is determined based on the following equations.

The turn-on time (T) is the sum function of weighted duty cycles $T_a$, $T_b$, and $T_c$. Turn-on time T can be represented by the following equation:

$$T = f(K_{T-ON} \text{ of } (T_a, T_b, \text{ and } T_c)), \tag{3}$$

where $K_{T-ON}$ is a coefficient of time-weighted duty cycles of switching times $T_a$, $T_b$, and $T_c$. Switching times $T_a$, $T_b$, and $T_c$ may be determined based on the 'average value' principle, which simplifies the implementation.

Figure 8:
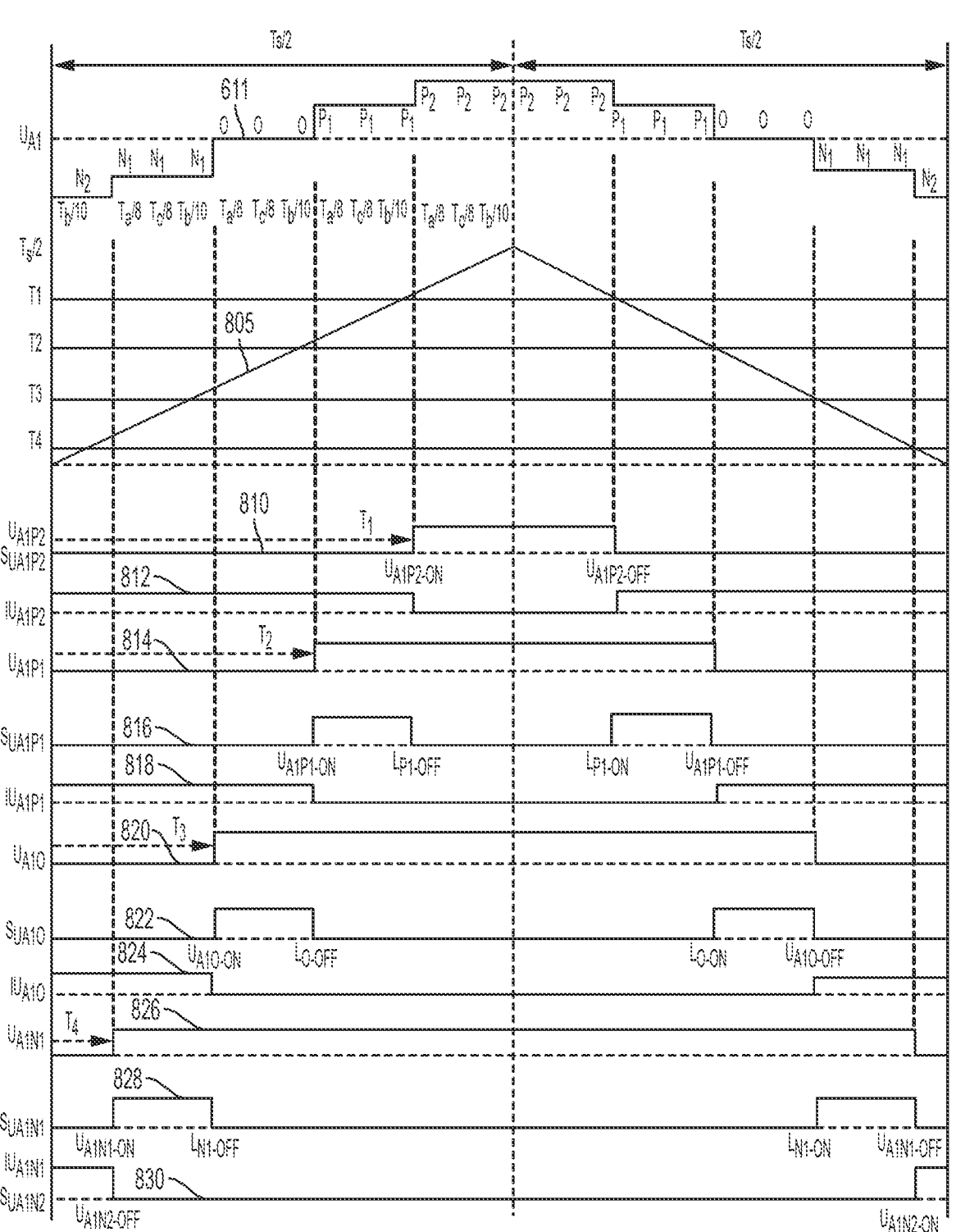
FIGS. 8-12 are waveform diagrams illustrating generation of turn-on time signals and switching logic signals according to embodiments of the present disclosure.

FIG. 8 is a waveform diagram illustrating generation of turn-on time signals ($U_{A1P2}$, $U_{A1P1}$, $U_{A1O}$, $U_{A1N1}$) and switching logic signals ($S_{UA1P2}$, $S_{UA1P1}$, $S_{UA1O}$, $S_{UA1N1}$, $S_{UA1N2}$) of respective $P_2$, $P_1$, O, $N_1$, $N_2$ voltage levels for waveform $U_{A1}$ of sector A and region 1. As shown in FIG. 8, the switching pattern during the first $T_S/2$ interval is repeated inversely in the next $T_S/2$ interval with appropriate segmentation of $T_a$, $T_b$, and $T_c$.

Capacitor voltage balancing of multi-level diode-clamped voltage source inverters (VSI) of STATCOM and MVUPS is an issue as it supplies or absorbs both active and reactive power. Capacitor voltage balancing becomes more difficult as the numbers of capacitor to be balanced is increased, e.g., from two (for three-level) to four (for five-level). Thus, switching sequences in opposite sectors (viz., A-D, B-E, and C-F) are selected to be of a complimentary nature to achieve capacitor neutral voltage balancing. The time interval duty cycles $T_a$, $T_b$, $T_c$ are distributed appropriately so as to generate symmetrical PWM waves with capacitor neutral point voltage balancing.

The turn-on time $T_1$ to establish the turn-on time signal ($U_{A1P2}$) of the $P_2$ voltage level is calculated as follows:

$$T_1 = K_{T-ON-a-A1} \ (T_a) + K_{T-ON-b-A1} \ (T_b) + K_{T-ON-c-A1} \ (T_c), \tag{3a}$$

where $K_{T-ON1-a-A1}$ is a coefficient of time-weighted duty cycle $T_a$, $K_{T-ON1-b-A1}$ is a coefficient of time-weighted duty cycle $T_b$, and $K_{T-ON1-c-A1}$ is a coefficient of time-weighted duty cycle $T_c$ of Sector A and Region 1.

The $K_{T-ON1-a-A1}$ value may be calculated as $3/8$ ($=1/8+1/8+1/8$), the $K_{T-ON1-b-A1}$ value may be calculated as $2/5$ ($=1/10+1/10+1/10+1/10$), and the $K_{T-ON1-c-A1}$ value may be calculated as $3/8$ ($=1/8+1/8+1/8$), as shown in FIG. 8.

Switching times ($T_a$, $T_b$, and $T_c$) are determined based on the 'average value' principle. Therefore, $$T_1 = 3/8 * T_S/3 + 2/5 * T_S/3 + 3/8 * T_S/3 = 0.76 * T_S/2 \tag{3a1}$$

The turn-on time $T_2$ to establish the turn-on time signal ($U_{A1P1}$) of the $P_1$ voltage level is calculated as follows:

$$T_2 = K_{T-ON-a-A1} \ (T_a) + K_{T-ON-b-A1} \ (T_b) + K_{T-ON-C-A1} \ (T_c), \tag{3b}$$

where $K_{T-ON2-a-A1}$ is a coefficient of time-weighted duty cycle $T_a$, $K_{T-ON2-b-A1}$ is a coefficient of time-weighted duty cycle $T_b$, and $K_{T-ON2-c-A1}$ is a coefficient of time-weighted duty cycle $T_c$ of Sector A and Region 1.

The $K_{T-ON2-a-A1}$ value may be calculated as $1/4$ ($=1/8+1/8$), the $K_{T-ON2-b-A1}$ value may be calculated as $3/10$ ($=1/10+1/10+1/10$), and the $K_{T-ON2-c-A1}$ value may be calculated as $1/4$ ($=1/8+1/8$), as shown in FIG. 8.

Switching times ($T_a$, $T_b$, and $T_c$) are determined based on the 'average value' principle. Therefore, $$T_2 = 1/4 * T_S/3 + 3/10 * T_S/3 + 1/4 * T_S/3 = 0.53 * T_S/2. \tag{3b1}$$

Similarly, $T_3$ for $U_{A1O}$ of the O voltage level and $T_4$ for $U_{A1N1}$ of the $N_1$ voltage level are determined for waveform $U_{A1}$ of Sector A and Region 1.

After the turn-on time values are calculated, they may be stored in memory and used to generate the switching logic signals. As shown in FIG. 8, an up/down counter signal 805 starts below switching time $T_4$ (e.g., time equal to zero), increases through switching times $T_4$-$T_1$ before reaching Ts/2, then, after reaching Ts/2, decreases through switching times $T_1$-$T_4$. Switching times $T_1$-$T_4$ are compared to the up/down counter signal 805, e.g., using comparators 1402-1408, respectively of FIG. 14, to obtain the $U_{A1P2}$ signal 810, the $U_{A1P1}$ signal 814, the $U_{A1O}$ signal 820, and the $U_{A1N1}$ signal 826. The $U_{A1P2}$ signal 810 is used as the switching signal $S_{UA1P2}$. The $U_{A1P2}$ signal 810, the $U_{A1P1}$ signal 814, the $U_{A1O}$ signal 820, and the $U_{A1N1}$ signal 826, are then inverted, e.g., by the inverters 1412-1418, respectively of FIG. 14, to obtain the $IU_{A1P2}$ signal 812, the $IU_{A1P1}$ signal 818, the $IU_{A1O}$ signal 824, and the $IU_{A1N1}$ signal 830. The $IU_{A1N1}$ signal 830 is used as the switching signal $SU_{A1N1}$. Then, the Boolean AND operation is performed on the $IU_{A1P2}$ signal 812 and the $U_{A1P1}$ signal 814, e.g., using the AND gate 1422 of FIG. 14, to obtain the $S_{UA1P1}$ switching signal 816. The Boolean AND operation is also performed on the $IU_{A1P1}$ signal 818 and the $U_{A1O}$ signal 820, e.g., using the AND gate 1424 of FIG. 14, to obtain the $S_{UA1O}$ switching signal 822. The Boolean AND operation is further performed on the $IU_{A1O}$ signal 824 and the $U_{A1N1}$ signal 826, e.g., using the AND gate 1426 of FIG. 14, to obtain the $S_{UA1N1}$ switching signal 828.

Figure 9:
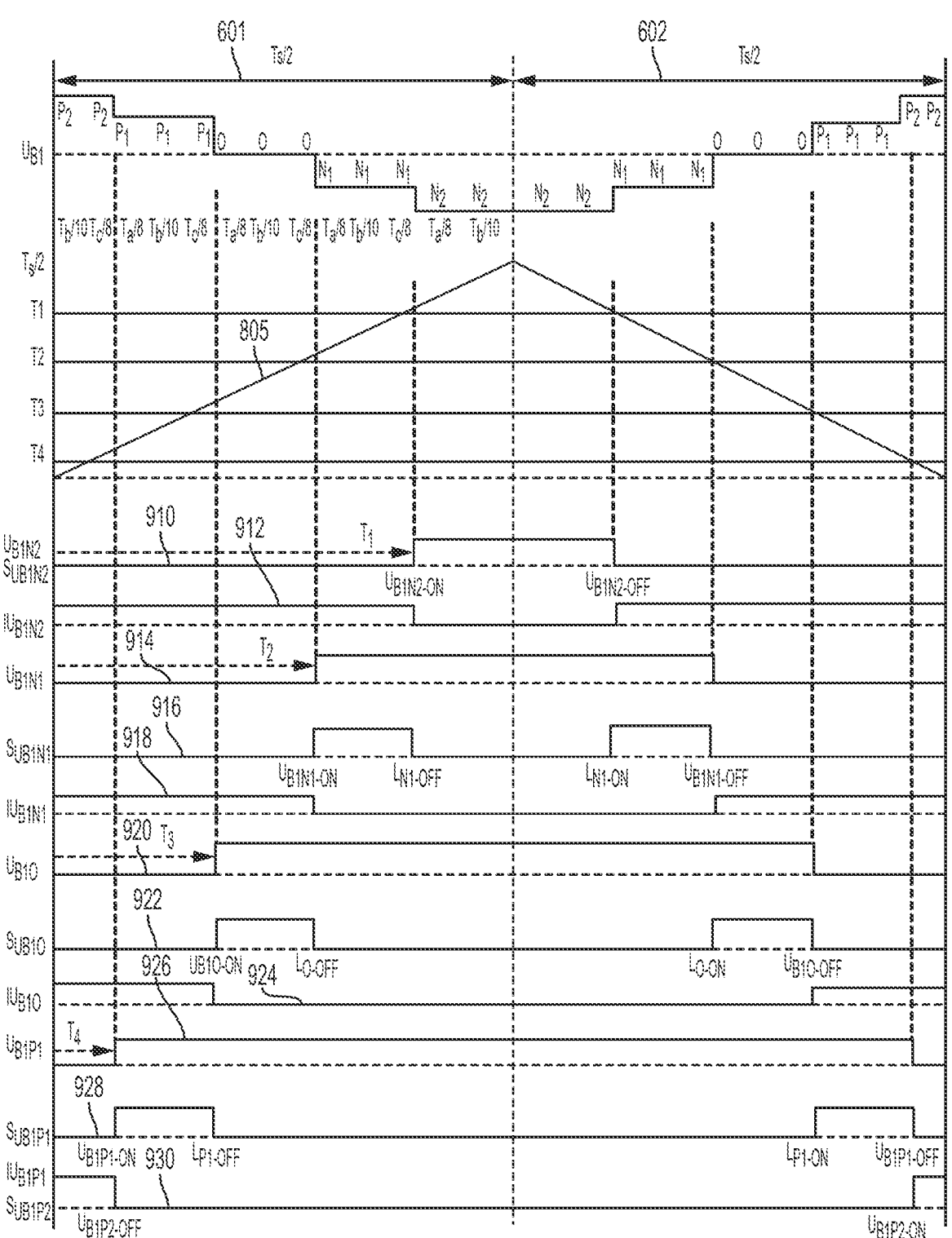

FIG. 9 is a waveform diagram illustrating the generation of turn-on time signals ($U_{B1N2}$, $U_{B1N1}$, $U_{B1O}$, $U_{B1P1}$) and switching logic signals ($S_{UB1N2}$, $S_{UB1N1}$, $S_{UB1O}$, $S_{UB1P1}$, $S_{UB1P2}$) of respective $N_2$, $N_1$, O, $P_1$, $P_2$ voltage levels for waveform $U_{B1}$ of sector B and Region 1. As shown in FIG. 9, the switching pattern during the first $T_S/2$ interval 601 is repeated inversely in the next $T_S/2$ interval 602 with appropriate segmentation of $T_a$, $T_b$, and $T_c$.

The turn-on time value $T_1$ to establish the turn-on time signal ($U_{B1N2}$) of $N_2$ voltage level may be calculated as follows:

$$T_1 = K_{T-ON1-a-B1} \ (T_a) + K_{T-ON1-b-B1} \ (T_b) + K_{T-ON1-c-B1} \ (T_c), \tag{4a}$$

where $K_{T-ON1-a-B1}$ is a coefficient of the time-weighted duty cycle $T_a$, $K_{T-ON1-b-B1}$ is a coefficient of the time-weighted duty cycle $T_b$, and $K_{T-ON1-c-B1}$ is a coefficient of time-weighted duty cycle $T_c$ of Sector B and Region 1.

The $K_{T-ON1-a-B1}$ value may be calculated as $3/8$ ($=1/8+1/8+1/8$), the $K_{T-ON1-b-B1}$ value may be calculated as $2/5$ ($=1/10+$ $\frac{1}{10}+\frac{1}{10}+\frac{1}{10}$), and the $K_{T-ON1-c-B1}$ value may be calculated as ($\frac{1}{8}+\frac{1}{8}+\frac{1}{8}+\frac{1}{8}=$) $\frac{1}{2}$ as shown in FIG. 9.

Switching times $T_a$, $T_b$, and $T_c$ are determined based on the average value principle. Therefore, $$T_1 = 3/8 * T_S/3 + 2/5 * T_S/3 + 1/2 * T_S/3 = 0.85 * T_S/2 \qquad (4a1)$$

The turn-on time value $T_2$ to establish turn-on time signal $U_{B1N1}$ of $N_1$ voltage level is calculated as follows:

$$T_2 = K_{T-ON2-a-B1} \ (T_a) + K_{T-ON2-b-B1} \ (T_b) + K_{T-ON2-c-B1} \ (T_c), \qquad (4b)$$

where $K_{T-ON2-a-B1}$ is a coefficient of time-weighted duty cycle $T_a$, $K_{T-ON2-b-B1}$ is a coefficient of time-weighted duty cycle $T_b$, and $K_{T-ON2-c-B1}$ is a coefficient of time-weighted duty cycle $T_c$ of Sector B and Region 1.

The $K_{T-ON2-a-B1}$ value may be calculated as $\frac{1}{4}$ ($=\frac{1}{8}+\frac{1}{8}$), the $K_{T-ON2-b-B1}$ value may be calculated as $\frac{3}{10}$ ($=\frac{1}{10}+\frac{1}{10}+\frac{1}{10}$) and the $K_{T-ON2-c-B1}$ value may be calculated as $\frac{3}{8}$ ($=\frac{1}{8}+\frac{1}{8}+\frac{1}{8}$) as shown in FIG. 9.

Switching times $T_a$, $T_b$, and $T_c$ are determined based on the average value principle. Therefore, $$T_2 = 1/4 * T_S/3 + 3/10 * T_S/3 + 3/8 * T_S/3 = 0.61 * T_S/2. \qquad (4b1)$$

Similarly, $T_3$ for $U_{B1O}$ of the O voltage level and $T_4$ for $U_{B1P1}$ of the $P_1$ voltage are determined for waveform $U_{B1}$ of Sector B and Region 1.

After the turn-on time values are calculated, they may be stored in memory and used to generate the switching logic signals. As shown in FIG. 9, the up/down counter signal 805 starts below switching time $T_4$ (e.g., a time equal to zero), increases through switching times $T_4$-$T_1$ before reaching $T_S/2$, then, after reaching $T_S/2$, decreases through switching times $T_1$-$T_4$. Switching times $T_1$-$T_4$ are compared to the up/down counter signal 805, e.g., using comparators 1402-1408, respectively of FIG. 14, to obtain the $U_{B1N2}$ signal 910, the $U_{B1N1}$ signal 914, the $U_{B1O}$ signal 920, and the $U_{B1P1}$ signal 926. The $U_{B1N2}$ signal 910 is used as the switching signal $S_{UB1N2}$.

Figure 14:
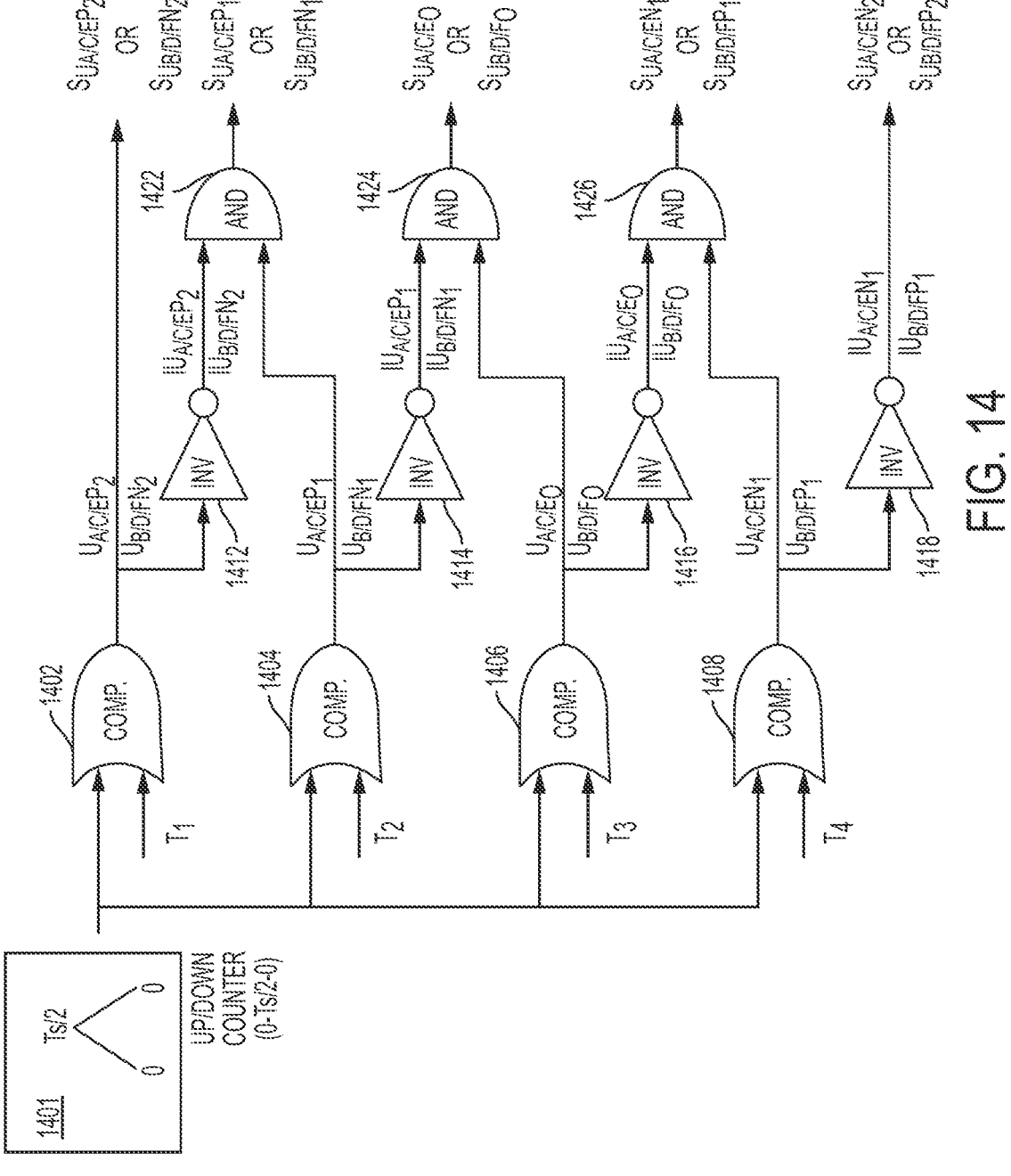
FIG. 14 is a digital logic circuit for generating switching logic signals to drive power transistors of a multi-level diode-clamped inverter according to embodiments of the present disclosure.

The $U_{B1N2}$ signal 910, the $U_{B1N1}$ signal 914, the $U_{B1O}$ signal 920, and the $U_{B1P1}$ signal 926, are then inverted, e.g., by the inverters 1412-1418, respectively of FIG. 14, to obtain the $IU_{B1N2}$ signal 912, the $IU_{B1N1}$ signal 918, the $IU_{B1O}$ signal 924, and the $IU_{B1P1}$ signal 930. The $IU_{B1P1}$ signal 930 is used as the switching signal $S_{UB1P1}$. Then, the Boolean AND operation is performed on the $IU_{B1N2}$ signal 912 and the $U_{B1N1}$ signal 914, e.g., using the AND gate 1422 of FIG. 14, to obtain the $S_{UB1N1}$ switching signal 916. The Boolean AND operation is also performed on the $IU_{B1N1}$ signal 918 and the $U_{B1O}$ signal 920, e.g., using the AND gate 1424 of FIG. 14, to obtain the $S_{UB1O}$ switching signal 922. The Boolean AND operation is further performed on the $IU_{B1O}$ signal 924 and the $U_{B1P1}$ signal 926, e.g., using the AND gate 1426 of FIG. 14, to obtain the $S_{UB1P1}$ switching signal 928.

Figure 10:
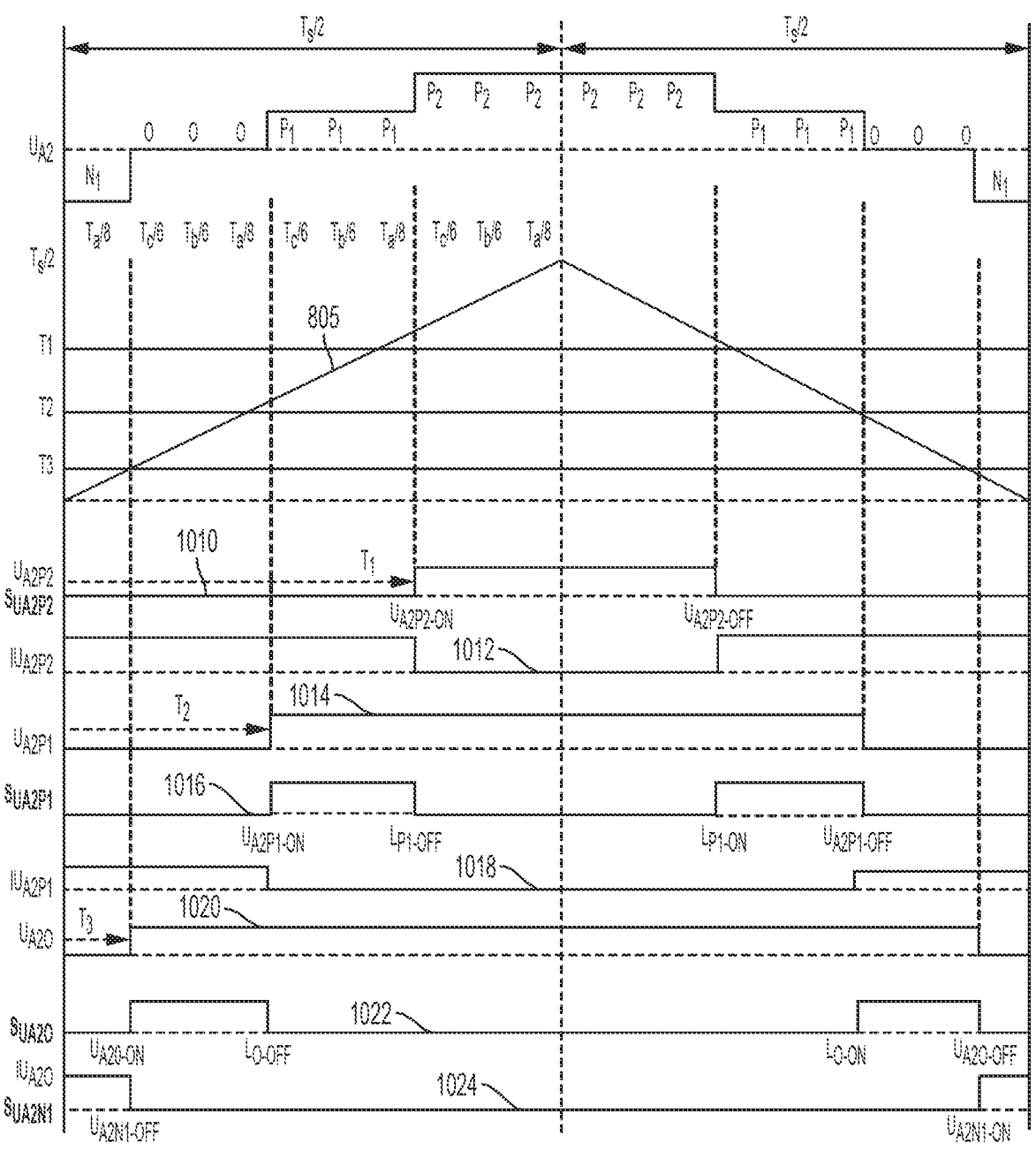

FIG. 10 is a waveform diagram illustrating the generation of turn-on time signals $U_{A2P2}$, $U_{A2P1}$, $U_{A2O}$ and switching logic signals $S_{UA2P2}$, $S_{UA2P1}$, $S_{UA2O}$, $S_{UA2N1}$ of the respective $P_2$, $P_1$, O, $N_1$ voltage level for waveform $U_{A2}$ of Sector A and Region 2.

As shown in FIG. 10, the up/down counter signal 805 starts below switching time $T_3$, increases through switching times $T_3$-$T_1$ before reaching $T_S/2$, then, after reaching $T_S/2$, decreases through switching times $T_1$-$T_3$. Switching times $T_1$-$T_3$ are compared to the up/down counter signal 805, e.g., using comparators 1402-1406, respectively of FIG. 14, to obtain the $U_{A2P2}$ signal 1010, the $U_{A2P1}$ signal 1014, and the $U_{A2O}$ signal 1020. The $U_{A2P2}$ signal 1010 is used as the switching signal $S_{UA2P2}$.

The $U_{A2P2}$ signal 1010, the $U_{A2P1}$ signal 1014, and the $U_{A2O}$ signal 1020, are then inverted, e.g., by the inverters 1412-1416, respectively of FIG. 14, to obtain the $IU_{A2P2}$ signal 1012, the $IU_{A2P1}$ signal 1018, and the $IU_{A2O}$ signal 1024. The $IU_{A2O}$ signal 1024 is used as the switching signal $S_{UA2N1}$. Then, the Boolean AND operation is performed on the $IU_{A2P2}$ signal 1012 and the $U_{A2P1}$ signal 1014, e.g., using the AND gate 1422 of FIG. 14, to obtain the $S_{UA2P1}$ switching signal 1016. The Boolean AND operation is also performed on the $IU_{A2P1}$ signal 1018 and the $U_{A2O}$ signal 1020, e.g., using the AND gate 1424 of FIG. 14, to obtain the $S_{UA2O}$ switching signal 1022.

Figure 11:
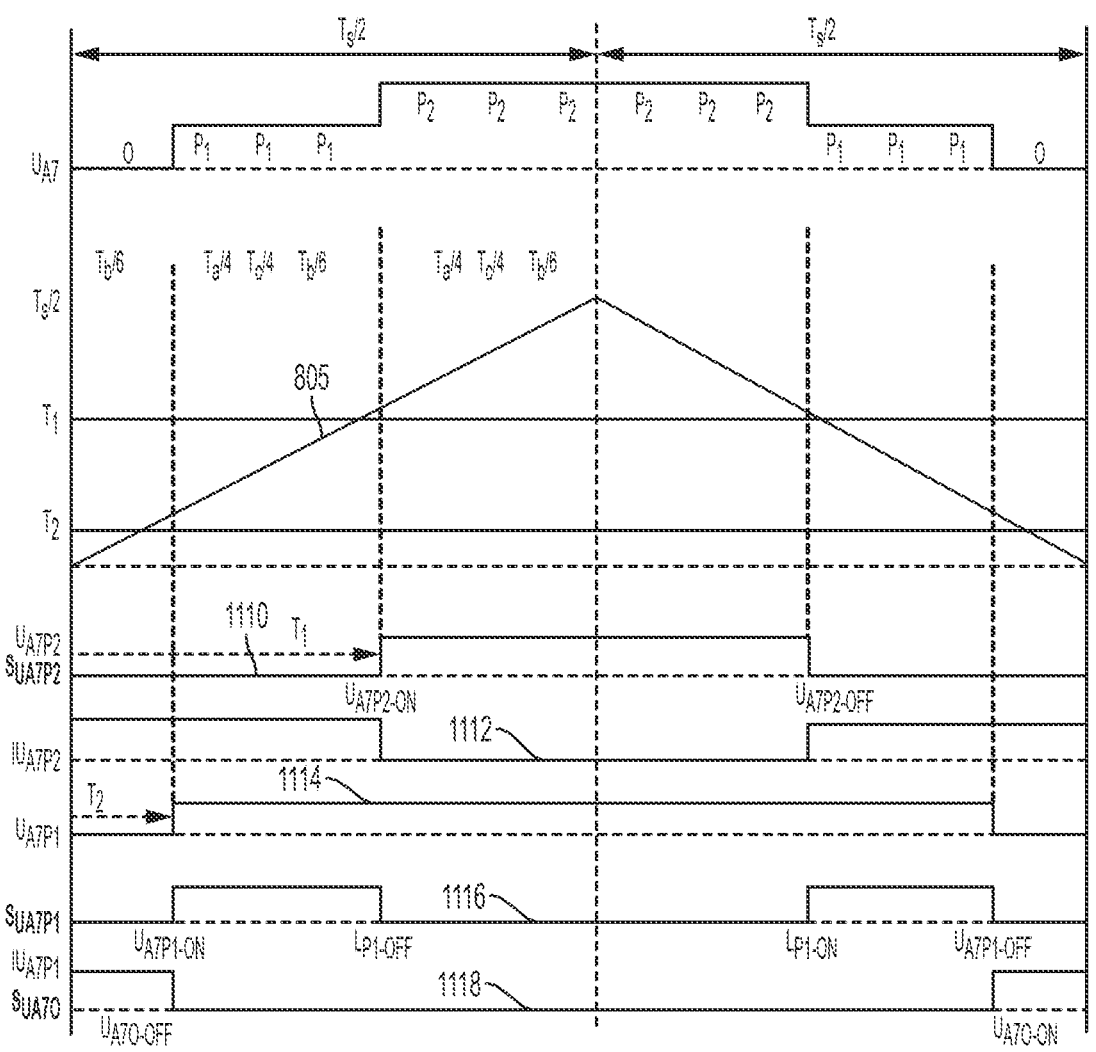

FIG. 11 is a waveform diagram illustrating the generation of turn-on time signals $U_{A7P2}$, $U_{A7P1}$ and switching logic signals $S_{UA7P2}$, $S_{UA7P1}$, $S_{UA7O}$ of the respective $P_2$, $P_1$, O voltage level for waveform $U_{A7}$ of Sector A and Region 7.

As shown in FIG. 11, the up/down counter signal 805 starts below switching time $T_2$, increases through switching times $T_2$ and $T_1$ before reaching $T_S/2$, then, after reaching $T_S/2$, decreases through switching times $T_1$ and $T_2$. Switching times $T_1$ and $T_2$ are compared to the up/down counter signal 805, e.g., using comparators 1402 and 1404, respectively of FIG. 14, to obtain the $U_{A7P2}$ signal 1110 and the $U_{A7P1}$ signal 1114. The $U_{A7P2}$ signal 1110 is used as the switching signal $S_{UA7P2}$.

The $U_{A7P2}$ signal 1110 and the $U_{A7P1}$ signal 1114 are then inverted, e.g., by the inverters 1412 and 1414, respectively of FIG. 14, to obtain the $IU_{A7P2}$ signal 1112 and the $IU_{A7P1}$ signal 1118. The $IU_{A7P1}$ signal 1118 is used as the switching signal $SU_{A7O}$. Then, the Boolean AND operation is performed on the $IU_{A7P2}$ signal 1112 and the $U_{A7P1}$ signal 1114, e.g., using the AND gate 1422 of FIG. 14, to obtain the $S_{UA7P1}$ switching signal 1116.

Figure 12:
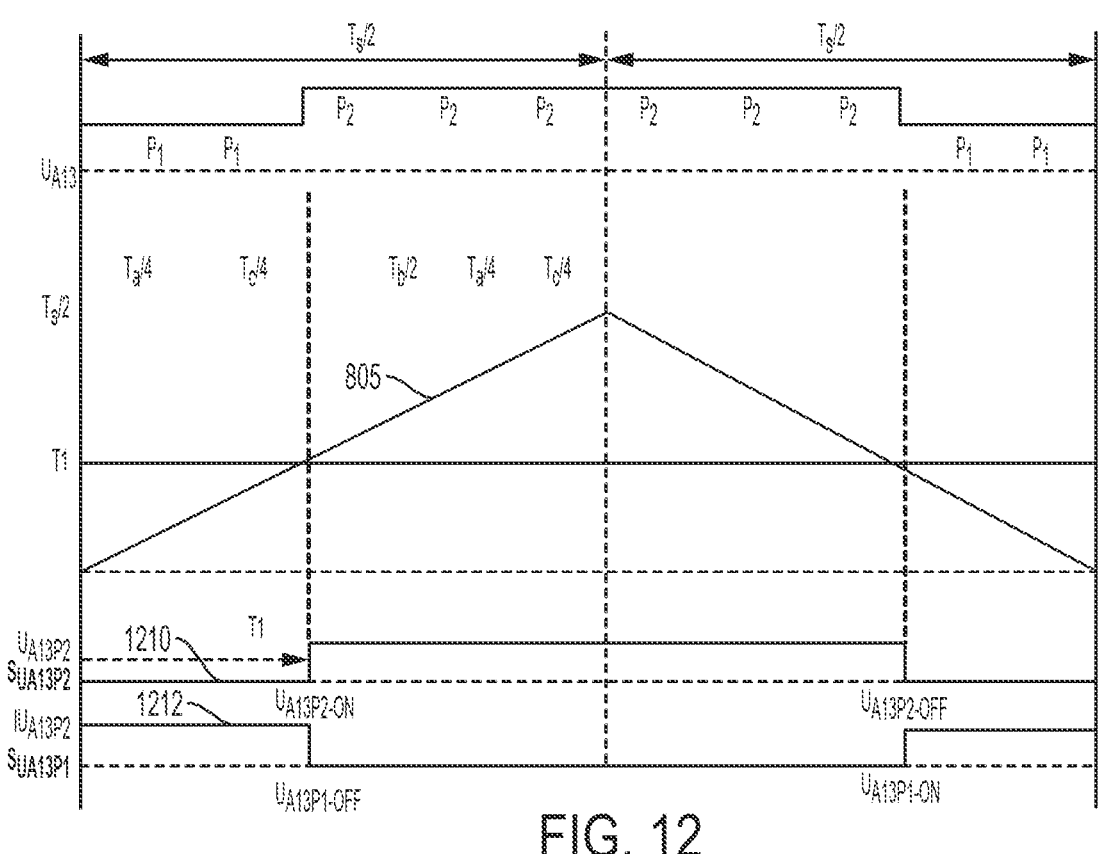

FIG. 12 is a waveform diagram illustrating the generation of turn-on time signal $U_{A13P2}$ and switching logic signals ($S_{UA13P2}$, $S_{UA13P1}$) of the respective $P_2$, $P_1$ voltage level for waveform $U_{A13}$ of Sector A and Region 13.

As shown in FIG. 12, the up/down counter signal 805 starts below switching time $T_1$ (e.g., time equal to zero), increases through switching time $T_1$ before reaching $T_S/2$, then, after reaching $T_S/2$, decreases through switching time $T_1$. Switching time $T_1$ is compared to the up/down counter signal 805, e.g., using comparator 1402, to obtain the $U_{A13P2}$ signal 1210, which is used as the switching signal $S_{UA13P2}$. The $U_{A13P2}$ signal 1210 is then inverted, e.g., by the inverter 1412 of FIG. 14, to obtain the $IU_{A13P2}$ signal 1212, which is used as the switching signal $S_{UA13P1}$.

Figure 13:
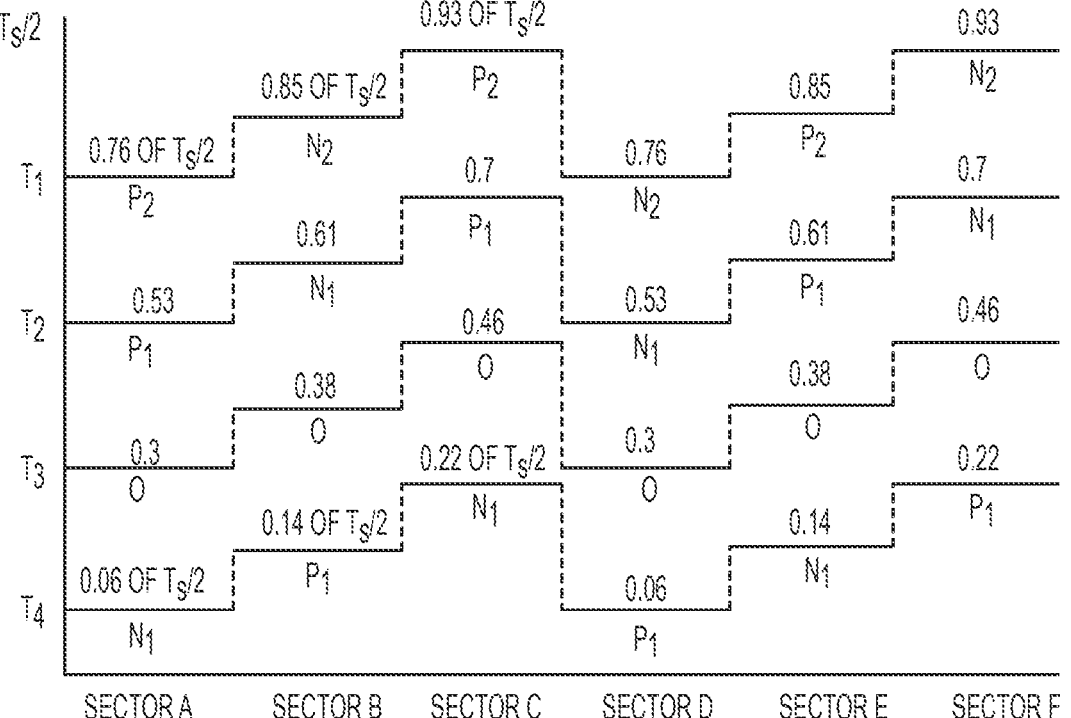
FIG. 13 is a graphical diagram illustrating turn-on time values for one phase according to embodiments of the present disclosure.

FIG. 13 is a graphical diagram illustrating example turn-on time values $T_1$, $T_2$, $T_3$, $T_4$ for phase U of all six sectors (Sectors A-F) and Region 1 based on the equations set forth above. As shown, the turn-on time values $T_1$, $T_2$, $T_3$, $T_4$ are given for the switching states of each of the sectors. For phases V and W, the waveforms are similar to the waveforms in FIGS. 8-12, but are mutually phase shifted by the angle $2\pi/3$.

PWM Signal Generation

FIG. 14 is a digital logic circuit for generating PWM switching signals for a five-level inverter. The digital logic circuit includes a first comparator 1402, a second comparator 1404, a third comparator 1406, a fourth comparator 1408, a first inverter 1412, a second inverter 1414, a third inverter 1416, a fourth inverter 1418, a first AND gate 1422, a second AND gate 1424, and a third AND gate 1426. The inverters 1412-1418 are digital logic inverters and are connected to outputs of the comparators 1402-1408, respectively. The AND gate 1422 has a first input connected to the output of the first inverter 1412 and a second input connected to the output of the second comparator 1404, the AND gate 1424 has a first input connected to the output of the second inverter 1414 and a second input connected to the output of the third comparator 1406; and the AND gate 1426 has a first input connected to the output of the third inverter 1416 and a second input connected to the output of the fourth comparator 1408.

The first inputs of the comparators 1402-1408 receive turn-on time values $T_1$, $T_2$, $T_3$, and $T_4$, respectively, and the second inputs of the comparators 1402-1408 receive the output from an up/down counter 1401. The up/down counter 1401 counts over a sampling period $T_S$ from 0 to $T_S/2$ and from $T_S/2$ to 0. The turn-on time values $T_1$, $T_2$, $T_3$, and $T_4$ are compared with the output of the up/down counter 1401 using digital logic comparators 1402-1408 to generate turn-on pulse signals $U_{A/C/EP2}$, $U_{A/C/EP1}$, $U_{A/C/EO}$, $U_{A/C/EN1}$ for A/C/E sectors or $U_{B/D/FN2}$, $U_{B/D/FN1}$, $U_{B/D/FO}$, $U_{B/D/FP1}$ for B/D/F sectors. These turn-on pulse signals are then logically inverted with multiple inverters 1412-1418 and logically ANDed by AND gates 1422-1426 to generate switching logic signals $S_{UA/C/EP2}$, $S_{UA/C/EP1}$, $S_{UA/C/EO}$, $S_{UA/C/EN1}$, $S_{UA/C/EN2}$ for A/C/E sectors or $S_{UB/D/FN2}$, $S_{UB/D/FN1}$, $S_{UB/D/FO}$, $S_{UB/D/FP1}$, $S_{UB/D/FP2}$ for B/D/F sectors for all sectors and regions. The comparators 1402-1408, the inverters 1412-1418, and the AND gates 1422-1426 may be implemented by a Field Programmable Gate Array (FPGA) or an Application Specific Integrated Circuit (ASIC) for high-bandwidth fast operation.

In embodiments, the number of comparators, inverters, and AND gates may be increased or decreased depending on the number of levels of the multi-level inverter.

As shown in FIG. 8, turn-on time values $T_1$, $T_2$, $T_3$, $T_4$ are used to generate switching logic signals $S_{UA1P2}$, $S_{UA1P1}$, $S_{UA1O}$, $S_{UA1N1}$, $S_{UA1N2}$. These switching logic signals are applied to gate drivers that drive respective power transistors, such as IGBT devices, to generate the $U_{A1}$ waveform of Phase U. Turn-on time values $T_1$, $T_2$, $T_3$, $T_4$ are used to generate switching logic signals for $P_2$, $P_1$, O, $N_1$, $N_2$ in that respective order for all A, C, and E odd sectors.

As shown in FIG. 9, turn-on time values $T_1$, $T_2$, $T_3$, $T_4$ are used to generate switching logic signals $S_{UB1N2}$, $S_{UB1N1}$, $S_{UB1O}$, $S_{UB1P1}$, $S_{UB1P2}$. These switching logic signals are applied to gate drivers to drive respective power transistors to generate the $U_{B1}$ waveform of Phase U in sector B of region 1. Turn-on time values $T_1$, $T_2$, $T_3$, $T_4$ are used to generate the switching logic signal for $N_2$, $N_1$, O, $P_1$, $P_2$ in that respective order for all B, D, and F even sectors.

Similar signal processing is done for all other regions and V and W phases using the digital logic circuit. The turn-on time values $T_1$, $T_2$, $T_3$, and $T_4$ are different for Phases V and W. Some portion of the same control circuit is used to generate switching logic signals based on the location of the voltage vector V* as shown in FIGS. 10, 11, and 12.

In embodiments, a single timer, counting from 0 to $T_S/2$ and then back to 0, and one digital logic circuit is used for all Sectors and Regions. Therefore, the complexity of SVPWM is simplified using the control system according to the present disclosure.

Region and Sector Identification of Five-Level Inverter

Figure 15:
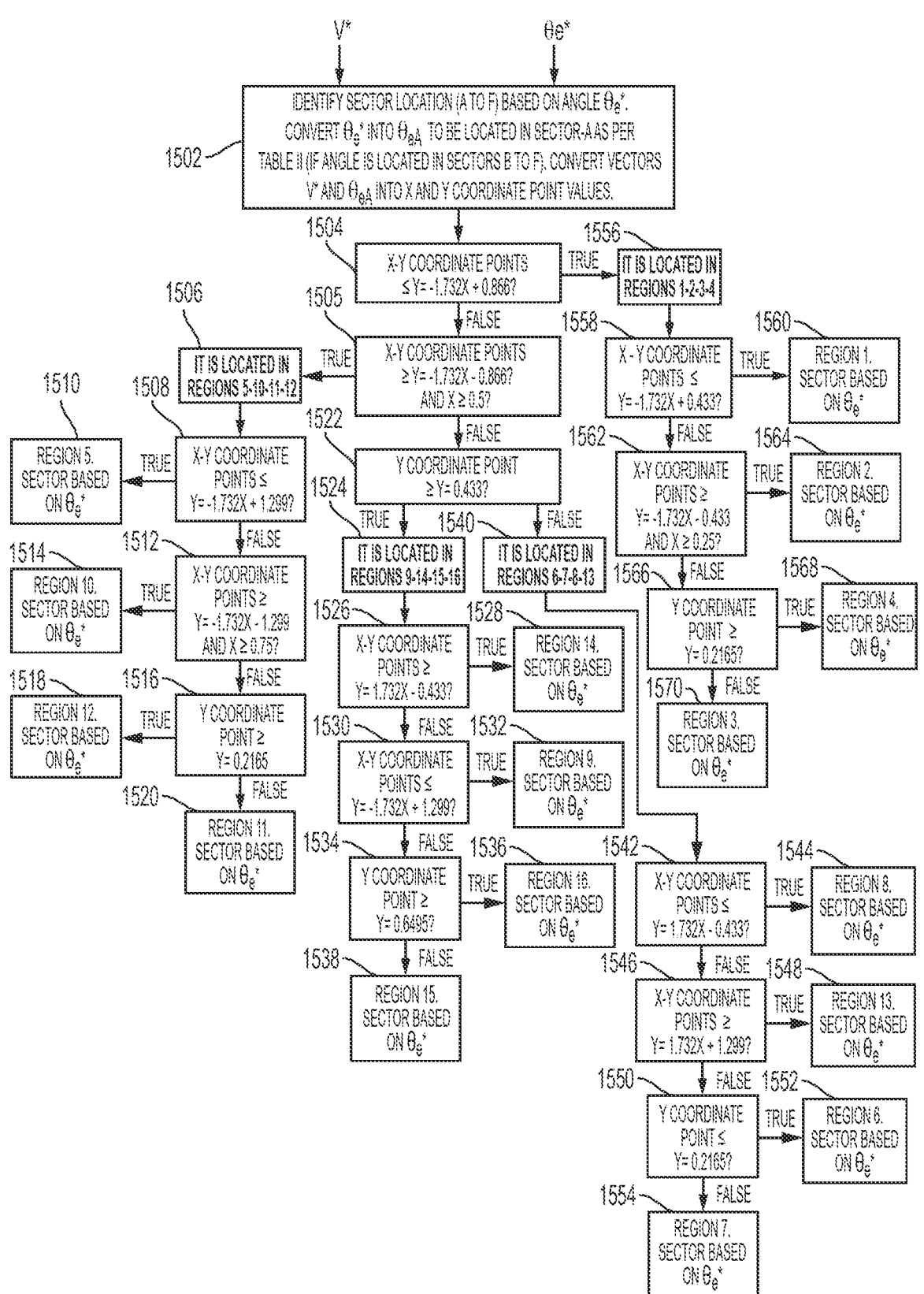
FIG. 15 is a flow diagram of a method of identifying region and sector locations of a voltage vector according to embodiments of the present disclosure.

FIG. 15 is a flow diagram of a method for determining region and sector locations of command voltage V*. In the beginning, the command or reference voltage V* and angle θe* are sampled. In step 1502, the current sector location is identified based on the angle θe*. For easy implementation and calculation, all angles θe* located in sectors B-F are remapped to sector A ($\theta_{eA}$) according to Table 2 below. Then, the command voltage V* and remapped angle $\theta_{eA}$ are converted into X and Y voltage vector coordinate point values. The X and Y voltage vector coordinate points are compared with a respective XY-line equation in a sector to determine the region.

TABLE 2

| $\theta_e$* Location | Sector | $\theta_{eA}$ |
|---|---|---|
| $0 \geq \theta_e$* $< \pi/3$ | A | $=\theta_e$* |
| $\pi/3 \geq \theta_e$* $< 2 * \pi/3$ | B | $=(\theta_e$* $- \pi/3)$ |
| $2 * \pi/3 \geq \theta_e$* $< \pi$ | C | $=(\theta_e$* $- 2 * \pi/3)$ |
| $\pi \geq \theta_e$* $< 4 * \pi/3$ | D | $=(\theta_e$* $- \pi)$ |
| $4 * \pi/3 \geq \theta_e$* $< 5 * \pi/3$ | E | $=(\theta_e$* $- 4 * \pi/3)$ |
| $5 * \pi/3 \geq \theta_e$* $< 2 * \pi$ | F | $=(\theta_e$* $- 5 * \pi/3)$ |

For example, as shown in FIG. 15, in step 1504, it is determined whether the X-Y coordinate points are less than or equal to Y=−1.732X+0.866. If the result of the determination in step 1504 is false, it is determined whether the X-Y coordinate points are greater than or equal to Y=−1.732X−0.866 and the X coordinate point is greater than or equal to 0.5, in step 1505. If the result of the determination in step 1505 is true, it is determined in step 1506 that the voltage vector V* is located in regions 5, 10, 11, or 12.

In step 1508, it is determined whether the X-Y coordinate points are less than or equal to Y=−1.732X+1.299. If the result of the determination in step 1508 is true, the voltage vector is determined to be in region 5, in step 1510. If the result of the determination in step 1508 is false, it is determined whether the X-Y coordinate points are greater than or equal to Y=−1.732X−1.299 and X is greater than or equal to 0.75, in step 1512. If the result of the determination in step 1512 is true, the voltage vector is determined to be in region 10, in step 1514. If the result of the determination in step 1512 is false, it is determined whether the Y coordinate point is greater than or equal to Y=0.2165, in step 1516. If the result of the determination in step 1516 is true, the voltage vector is determined to be in region 12, in step 1518. If the result of the determination in step 1516 is false, the voltage vector is determined to be in region 11, in step 1520.

If the result of the determination in step 1505 is false, it is determined whether the Y coordinate point is greater than or equal to Y=0.433 in step 1522. If the result of the determination in step 1522 is true, it is determined in step 1524 that the voltage vector V* is located in regions 9, 14, 15, or 16. In step 1526, it is determined whether the X-Y coordinate points are greater than or equal to Y=1.732X−0.433. If the result of the determination in step 1526 is true, the voltage vector is determined to be in region 14, in step 1528. If the result of the determination in step 1526 is false, it is determined whether the X-Y coordinate points are less than or equal to Y=−1.732X+1.299, in step 1530. If the result of the determination in step 1530 is true, the voltage vector is determined to be in region 9, in step 1532. If the result of the determination in step 1530 is false, it is determined whether the Y coordinate point is greater than or equal to Y=0.6495, in step 1534. If the result of the determination in step 1534 is true, the voltage vector is determined to be in region 16, in step 1536. If the result of the determination in step 1534 is false, the voltage vector is determined to be in region 15, in step 1538.

If the result of the determination in step 1522 is false, it is determined in step 1540 that the voltage vector V* is located in regions 6, 7, 8, or 13. In step 1542, it is determined whether the X-Y coordinate points are less than or equal to Y=1.732X−0.433. If the result of the determination in step 1542 is true, the voltage vector is determined to be in region 8, in step 1544. If the result of the determination in step 1542 is false, it is determined whether the X-Y coordinate points are greater than or equal to Y=−1.732X+1.299, in step 1546. If the result of the determination in step 1546 is true, the voltage vector is determined to be in region 13, in step 1548. If the result of the determination in step 1546 is false, it is determined whether the Y coordinate point is less than or equal to Y=0.2165, in step 1550. If the result of the determination in step 1550 is true, the voltage vector is determined to be in region 6, in step 1552. If the result of the determination in step 1550 is false, the voltage vector is determined to be in region 7, in step 1554.

If the result of the determination in step 1504 is true, it is determined in step 1556 that the voltage vector V* is located in regions 1, 2, 3, or 4. In step 1558, it is determined whether the X-Y coordinate points are less than or equal to Y=−1.732X+0.433. If the result of the determination in step 1558 is true, the voltage vector is determined to be in region 1, in step 1560. If the result of the determination in step 1558 is false, it is determined whether the X-Y coordinate points are greater than or equal to Y=−1.732X−0.433 and the X coordinate point is greater than or equal to 0.25, in step 1562. If the result of the determination in step 1562 is true, the voltage vector is determined to be in region 2, in step 1564. If the result of the determination in step 1562 is false, it is determined whether the Y coordinate point is greater than or equal to Y=0.2165, in step 1566. If the result of the determination in step 1566 is true, the voltage vector is determined to be in region 4, in step 1568. If the result of the determination in step 1566 is false, the voltage vector is determined to be in region 3, in step 1570.

SVPWM Controller

Once turn-on time values $T_1$, $T_2$, $T_3$, $T_4$ have been calculated for all $P_2$, $P_1$, O, $N_1$, $N_2$ states of all phases, it is possible to evaluate them in real time with the help of a DSP and establish the Space Vector PWM waves with the help of FPGA-based single timer and single digital logic circuit as shown in FIG. 14.

Figure 16:
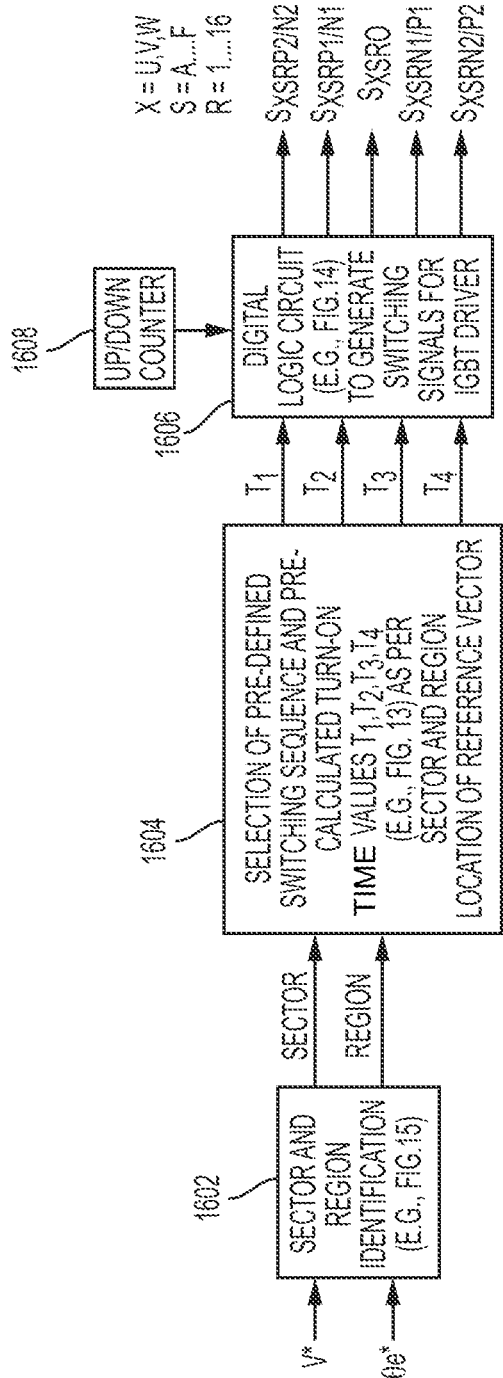
FIG. 16 is a SVPWM controller for a five-level diode-clamped inverter according to embodiments of the present disclosure.

FIG. 16 is a block diagram illustrating a control system for a five-level diode clamped inverter. The control system includes a processor, such as a digital signal processor (DSP), which is used to implement blocks 1602 and 1604. Blocks 1602 and 1604 are easily implemented to carry out the SVPWM control strategy.

In block 1602, the processor samples a reference voltage vector V* and an angle $\theta_e$*, and identifies a sector and region based on the sampled reference voltage vector V* and angle $\theta_e$*. In block 1604, the processor selects predefined switching sequences and pre-calculated turn-on signal values $T_1$, $T_2$, $T_3$, $T_4$ based on the identified sector and region location of the reference voltage vector V*.

The control system also includes a digital logic circuit 1606, such as an FPGA, and an up/down counter for generating PWM switching signals. The digital logic circuit 1606, such as the digital logic circuit of FIG. 14, generates PWM switching signals for the power transistor drivers based on the turn-on signal values $T_1$, $T_2$, $T_3$, $T_4$ and the selected switching sequence. In embodiments, less expensive DSPs and FPGAs may be used because the overall control implementation is divided between a DSP and an FPGA circuit.

As described above, the overall control operation is divided into multiple modes (e.g., Modes 1-4) in terms of sector and region locations. A single digital logic circuit 1606 is used to generate switching logic signals for all the regions and sectors. This simplifies the control system and, in turn, reduces time to implement at minimum cost. Also, to simplify the control system, one up/down counter 1608 (counting from 0 to $T_S/2$ and then from $T_S/2$ to 0) with sampling period $T_S$ may be utilized.

Figure 17:
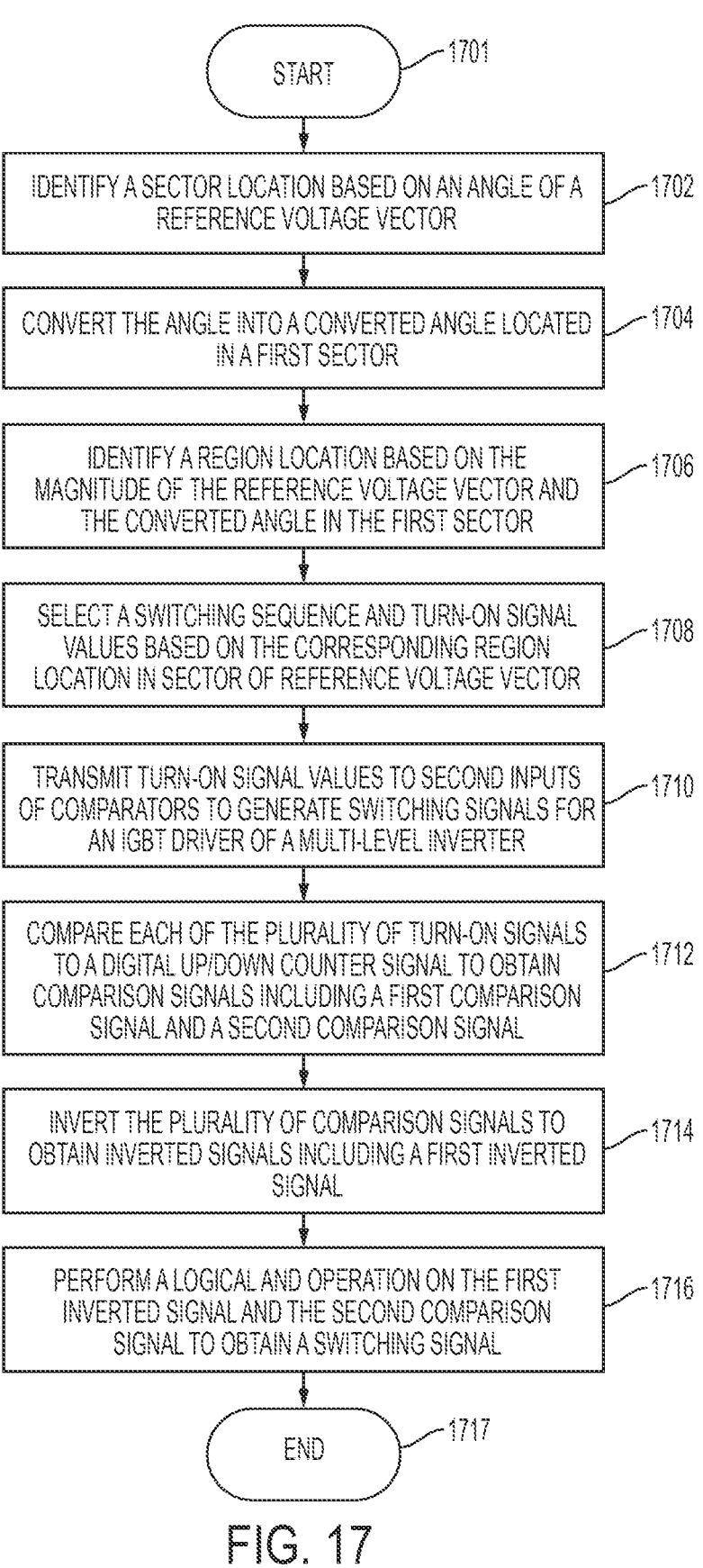
FIG. 17 is a flow diagram of a method of controlling a multi-level inverter according to embodiments of the present disclosure.

FIG. 17 is a flow diagram of a method of controlling a multi-level inverter according to embodiments of the present disclosure. After starting in step 1701, a sector location is identified based on an actual angle of a reference voltage vector, in step 1702. In step 1704, the actual angle is converted into a converted angle located in a first sector and, in step 1706, a region location is identified based on the magnitude of the reference voltage vector and the converted angle in the first sector. In step 1708, a switching sequence and a plurality of turn-on signal values are selected based on the corresponding region location in the actual sector of the reference voltage vector. In step 1710, turn-on signal values are transmitted to second inputs of the plurality of comparators to generate switching signals for a power transistor driver of a multi-level inverter. In step 1712, each of the plurality of turn-on signals are compared to a digital up/down counter signal to obtain a plurality of comparison signals including a first comparison signal and a second comparison signal. In step 1714, the plurality of comparison signals are inverted to obtain a plurality of inverted signals including a first inverted signal. Then, before ending in step 1717, a logical AND operation is performed on the first inverted signal and the second comparison signal to obtain a switching signal for a corresponding driver that drives a power transistor of a multi-level inverter in step 1716.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A control system for a multi-level inverter, comprising:
   a processor;
   a memory having stored thereon instructions, which, when executed by the processor, causes the processor to:
   receive a reference voltage vector and an associated angle;
   determine an operational parameter of the multi-level inverter based on the reference voltage vector and the associated angle;
   select a switching sequence and corresponding turn-on time values for switching states based on the determined operational parameter; and generate pulse width modulation (PWM) switching signals based on the selected switching sequence and the corresponding turn-on time values, the switching signals driving power transistors of the multi-level inverter in a modulation region of the multi-level inverter.

2. The control system of claim 1, wherein the operational parameter is a region.

3. The control system of claim 1, further comprising a counter configured to count from 0 to Ts/2 and then from Ts/2 to 0, where Ts is a sampling period.

4. The control system of claim 1, wherein the circuit is implemented by a Field Programmable Gate Array (FPGA), an Application Specific Integrated Circuit (ASIC), or a combination thereof.

5. The control system of claim 1, wherein the processor and the memory are implemented by a digital signal processor (DSP).

6. The control system of claim 1, wherein the instructions, when executed by the processor, further cause the processor to:
  convert the reference voltage vector and the associated angle into X and Y coordinate point values; and
  identify the region based on X and Y coordinate point values.

7. The control system of claim 6, wherein the determining the region includes comparing the X and Y coordinate point values to geometric inequalities that define triangular regions in a vector space.

8. The control system of claim 6, wherein the switching sequence and the corresponding turn-on time values are predetermined for each region.

9. The control system of claim 1, wherein the switching sequence and the corresponding turn-on time values are stored in a look-up table.

10. A method of controlling a multi-level inverter, comprising:
  receiving a reference voltage vector and an associated angle;
  determining an operational parameter of the multi-level inverter based on the reference voltage vector and the associated angle;
  selecting a switching sequence and corresponding turn-on time values for switching states based on the determined operational parameter; and
  generating pulse width modulation (PWM) switching signals based on the selected switching sequence and the corresponding turn-on time values, the switching signals driving power transistors of the multi-level inverter in a modulation region of the multi-level inverter.

11. The method of claim 10, wherein the operational parameter is a region.

12. The method of claim 10, further comprising:
  converting the reference voltage vector and the associated angle into X and Y coordinate point values; and
  identifying the region based on X and Y coordinate point values.

13. The method of claim 12, wherein the identifying the region includes comparing the X and Y coordinate point values to, geometric inequalities that define triangular regions in a vector space.

14. The method of claim 10, wherein the switching sequence and the corresponding turn-on time values are predetermined for each region.

15. The method of claim 10, wherein the switching sequence and the corresponding turn-on time values are stored in a look-up table stored in a memory.

16. An energy storage system comprising:
  an energy storage system;
  a DC-DC converter coupled to the energy storage system;
  a multi-level inverter coupled to the DC-DC converter; and
  a controller for the multi-level inverter, the controller comprising:
    a processor;
    a memory having stored thereon instructions, which, when executed by the processor, causes the processor to:
      receive a reference voltage vector and an associated angle;
      determine an operational parameter of the multi-level inverter based on the reference voltage vector and the associated angle;
      select a switching sequence and corresponding turn-on time values for switching states based on the determined operational parameter; and
      generate pulse width modulation (PWM) switching signals based on the selected switching sequence and the corresponding turn-on time values, the switching signals driving power transistors of the multi-level inverter in a modulation region of the multi-level inverter.

17. The control system of claim 1, wherein the circuit is further configured to:
  compare each turn-on time value to a counter signal to generate comparison signals;
  invert at least one of the comparison signals; and
  perform logical AND operations on selected combinations of inverted and non-inverted comparison signals to generate the PWM switching signals.

18. The control system of claim 1, wherein the selecting of the switching sequence and corresponding turn-on time values is further based on a predefined operational mode, each predefined operational mode corresponding to a group of regions within a vector space of the multi-level inverter.

19. The control system of claim 1, wherein PWM signal is a symmetrical PWM signal.

* * * * *